A. E. OSWALD.
TYPEWRITER STROKE AND WORD COUNTING AND SIGNALING DEVICE AND SPEED INDICATOR.
APPLICATION FILED OCT. 29, 1918.

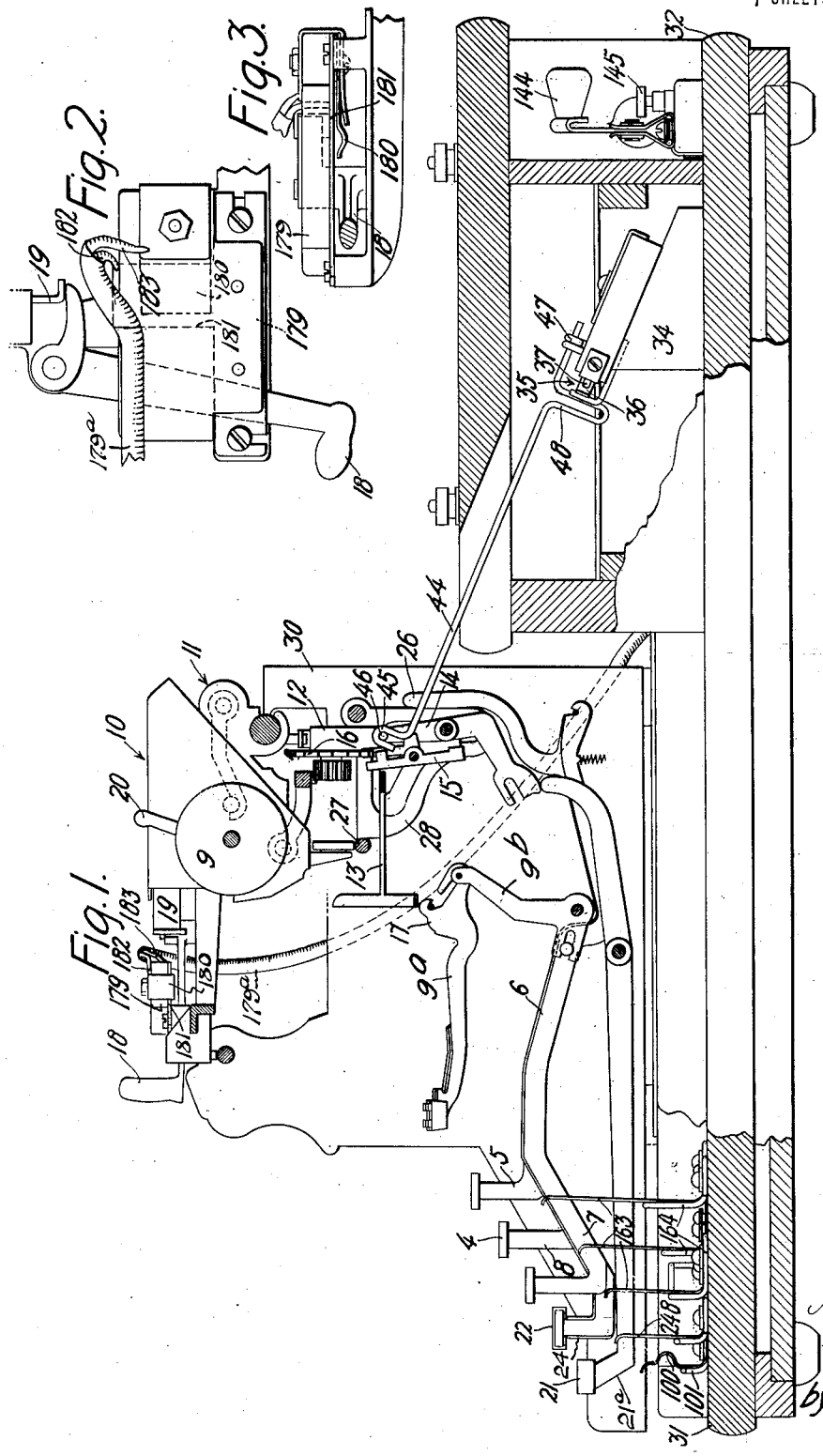

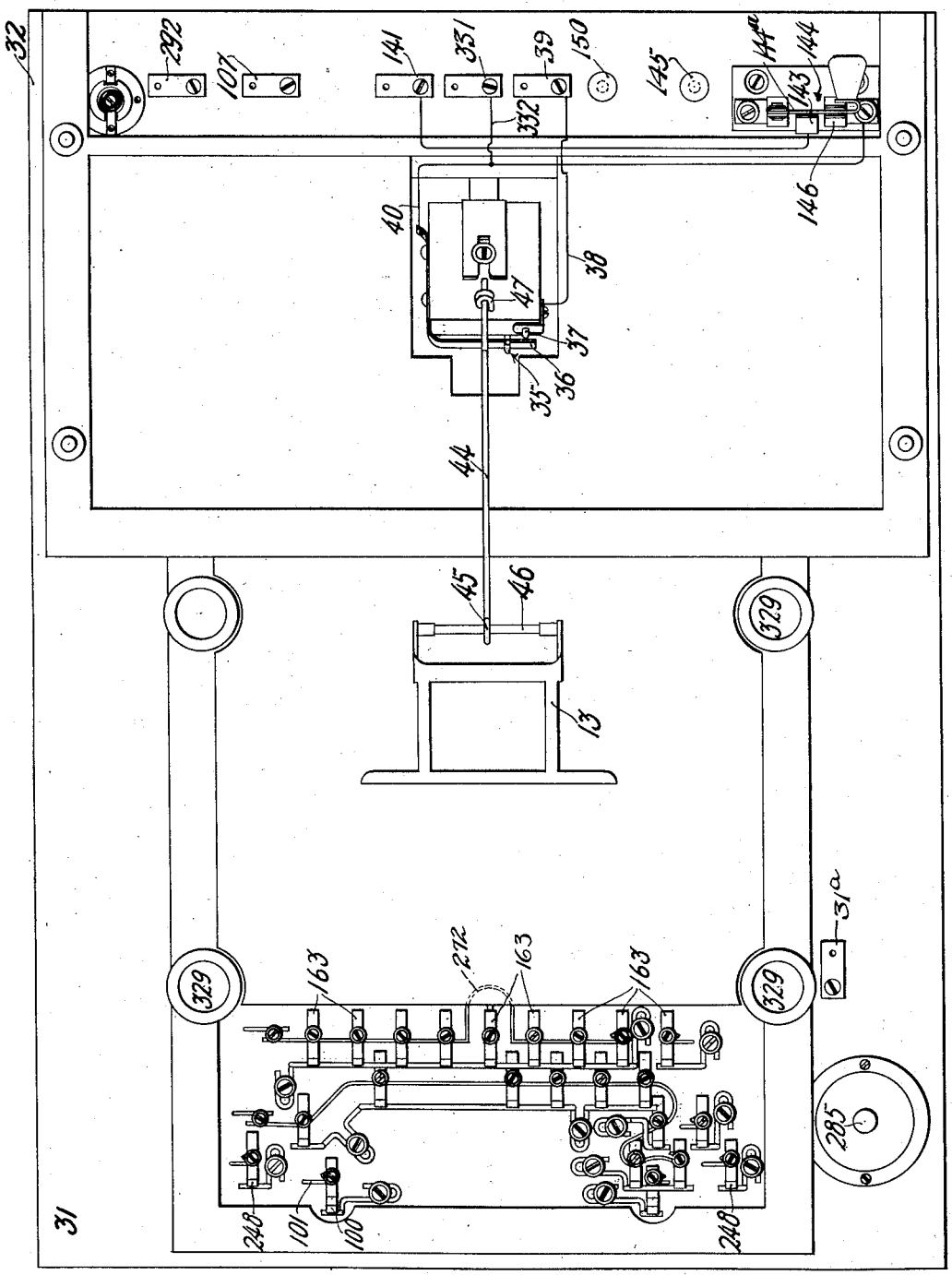

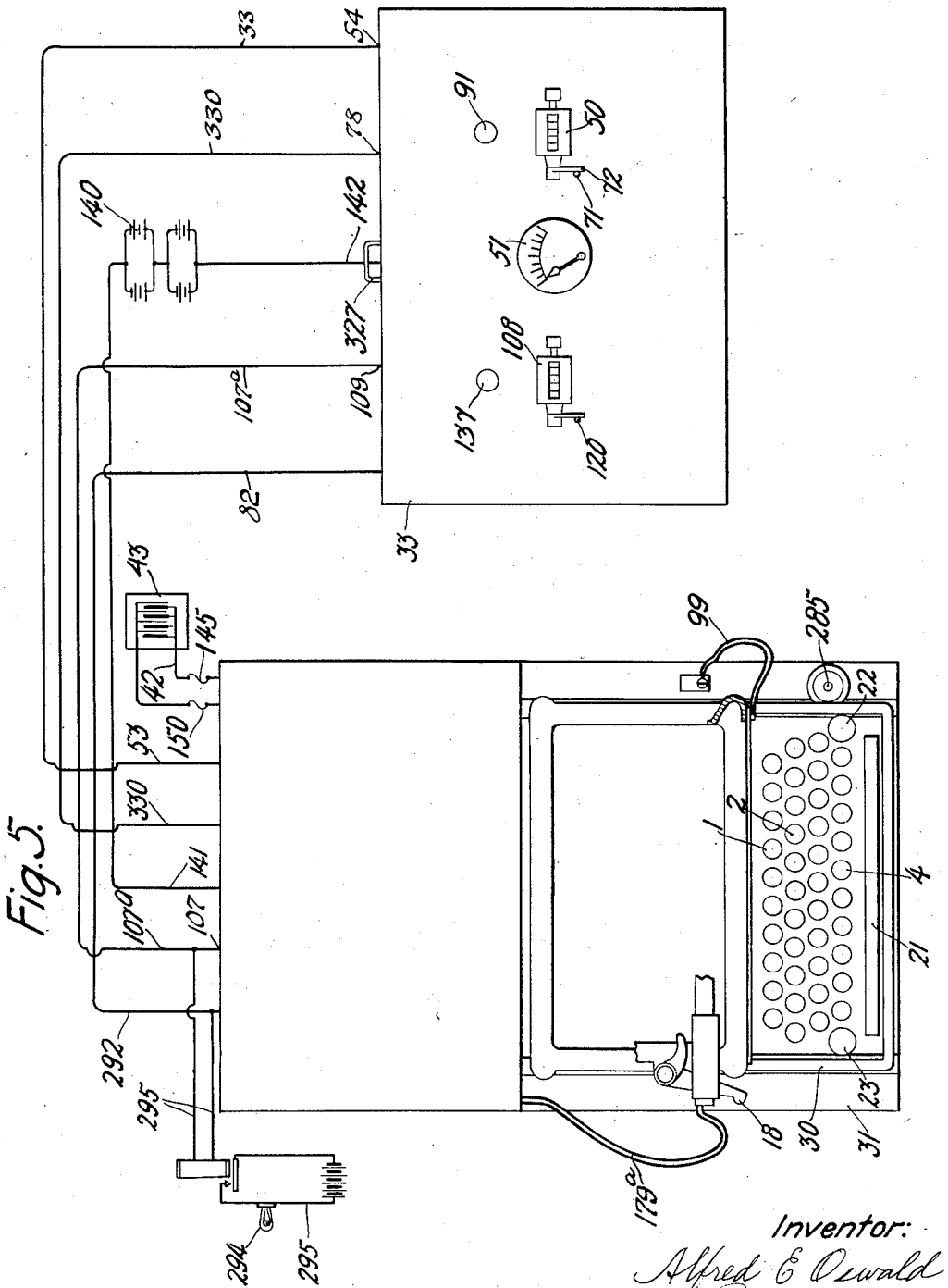

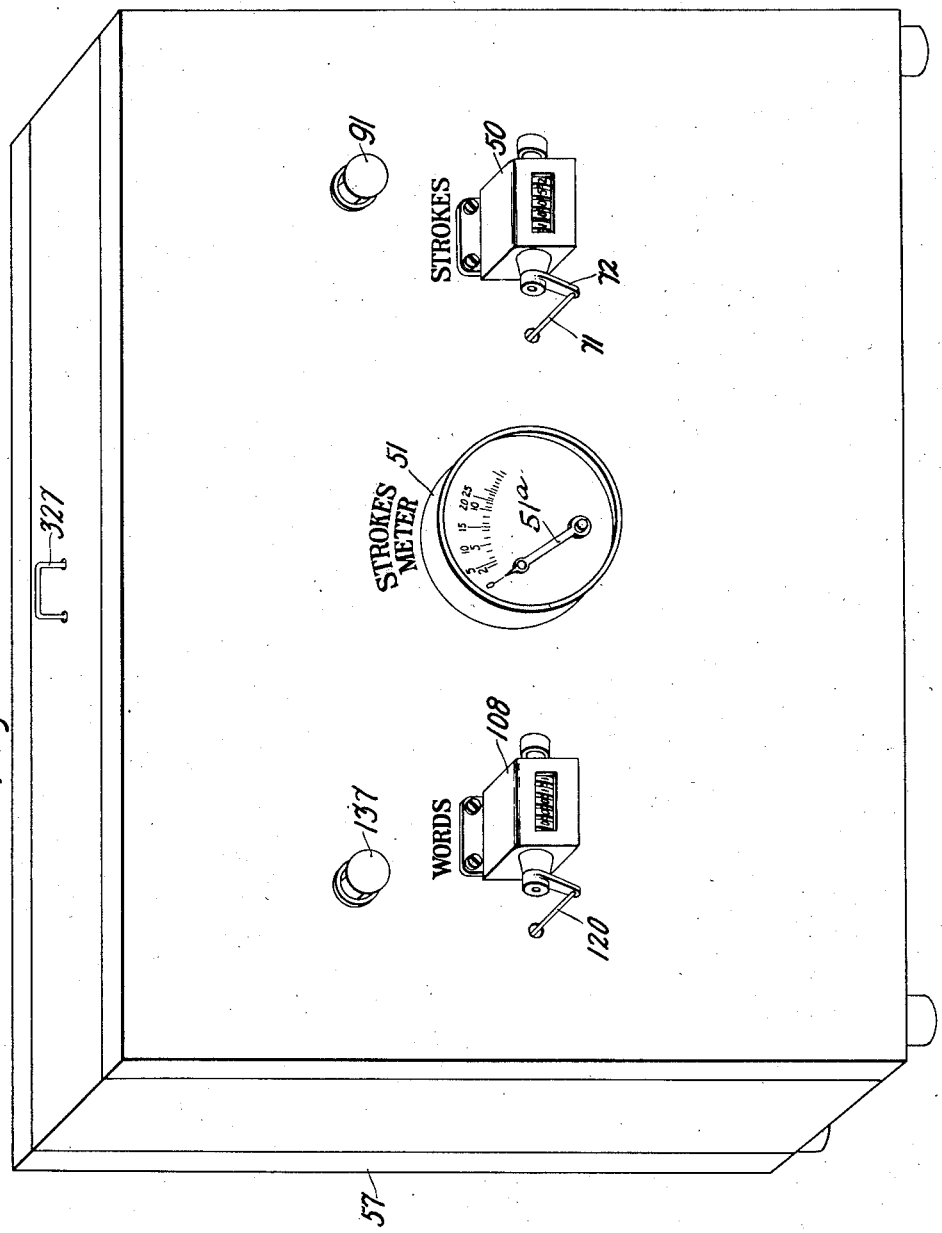

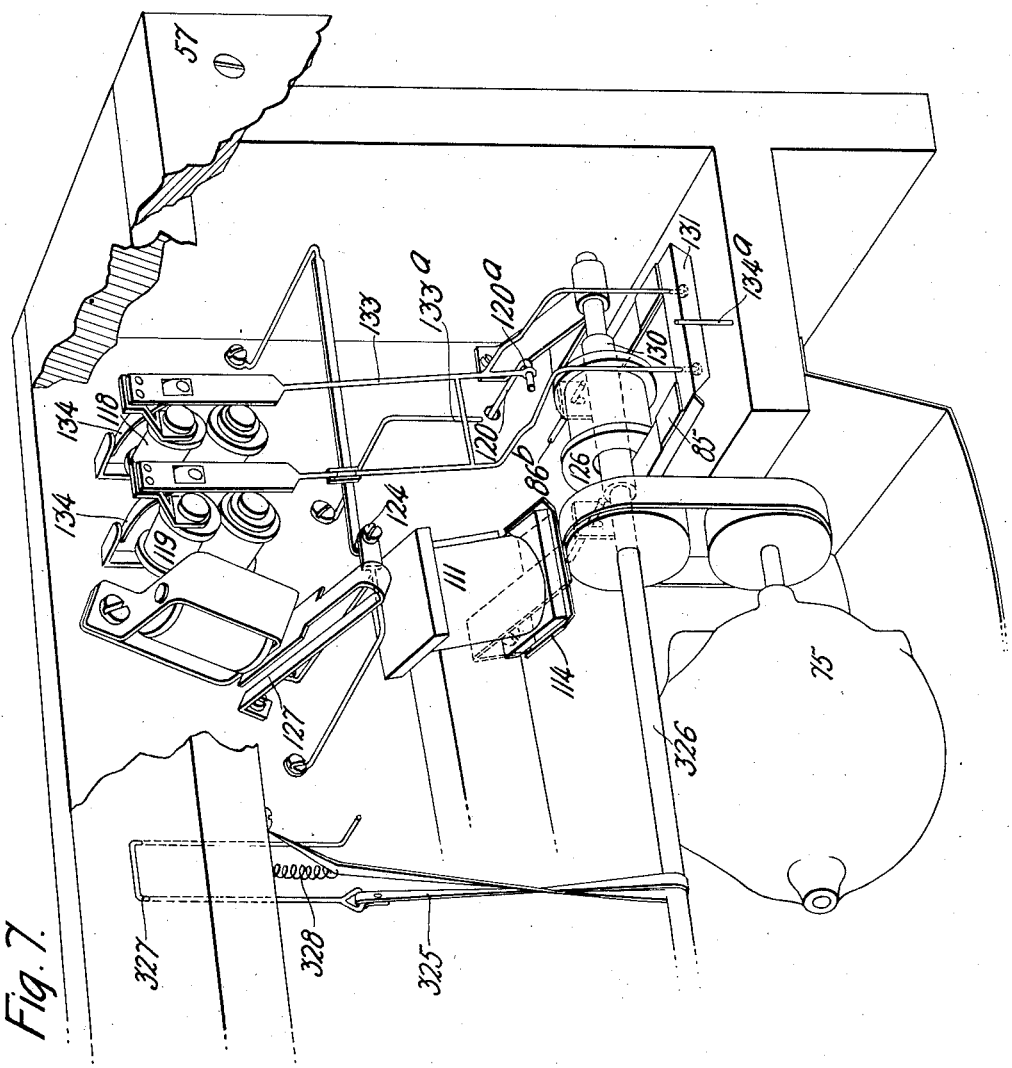

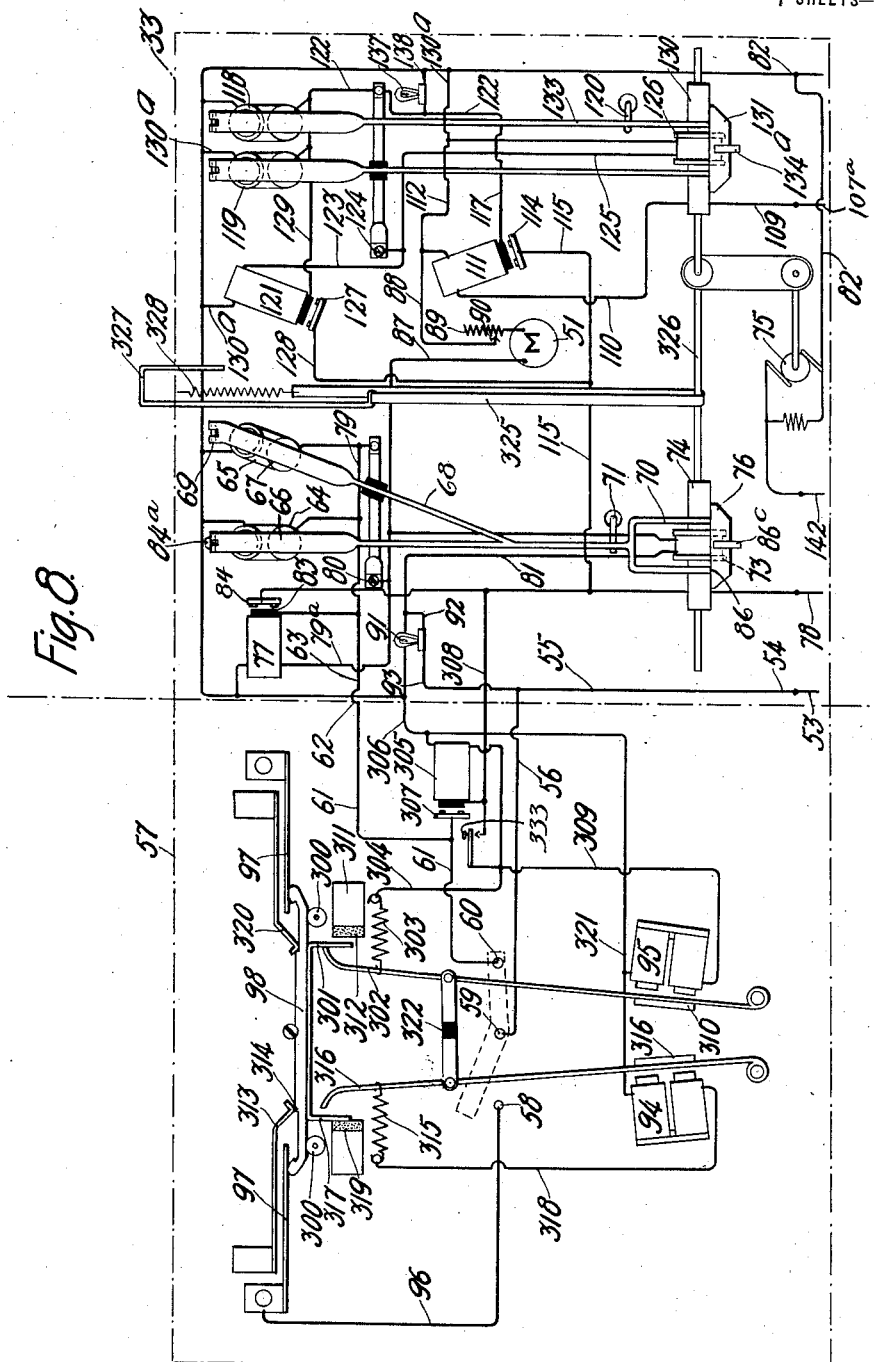

1,411,579.

Patented Apr. 4, 1922.

Inventor:
Alfred E Oswald
by B C Stickney
Attorney

UNITED STATES PATENT OFFICE.

ALFRED E. OSWALD, OF SCHENECTADY, NEW YORK, ASSIGNOR TO UNDERWOOD TYPEWRITER COMPANY, OF NEW YORK, N. Y., A CORPORATION OF DELAWARE.

TYPEWRITER STROKE AND WORD COUNTING AND SIGNALING DEVICE AND SPEED INDICATOR.

1,411,579.   Specification of Letters Patent.   Patented Apr. 4, 1922.

Application filed October 29, 1918. Serial No. 260,220.

*To all whom it may concern:*

Be it known that I, ALFRED E. OSWALD, a citizen of the United States, residing in Schenectady, in the county of Schenectady and State of New York, have invented certain new and useful Improvement in Typewriter Stroke and Word Counting and Signaling Device and Speed Indicator, of which the following is a specification.

This invention relates to registering or displaying mechanism, and is herein described as applied to mechanism which is adapted to separately register automatically both the number of words and number of strokes of ordinary typewriting, and is also adapted to indicate at any given moment the speed at which said writing is being done at that moment, and to light a signal, such as a display lamp, for each word or stroke, or both.

In order to enable such mechanism to give a truthful indication, it is necessary that it do a great deal more than register the actuations of the space-bar and the universal bar, since the space-bar is operated at other times than for making single spaces between words, and also because mere enumeration of the operations of a space-bar enables a dishonest typist to easily "beat" any ordinary mechanism. The mechanism is, therefore, herein set forth as adapted to actually count separately key-strokes, and words, and such written symbols as count for words.

According to the present disclosure, these and other results may be obtained by providing that the actuations of the usual space-bar may be counted, but only counted under such conditions as will insure that a word or a symbol to be counted as a word has been written previous to each actuation of the space-bar. In the present disclosure, this is obtained in a comparatively simple manner, so far as mere words are concerned, by providing that the space-bar operations shall be counted for the first operation thereof after the writing of a vowel, the connections being so arranged that writing of a second vowel shall in the main be ineffective on the mechanism, and also that a second actuation of the space-bar, unaccompanied by a previous writing of a vowel, shall be ineffective to actuate the registering mechanism. Since a word is often written at the end of a line followed by actuation of the line-space lever without actuation of the space-bar, connections may be provided to enable the actuation of that lever to play the part of the usual space-bar at that time.

In order to enable words to be accurately counted, even though they are written at the end of a line and separated into two parts by a hyphen, connections are provided whereby the hyphen may play the part of the space-bar, but these connections are in effect interlocked with the line-space lever connections. Since numerals are often technically counted as words, connections may be provided whereby the writing of numerals may control the actuation of the register in a way similar to the writing of vowels. Besides this, the question mark, the comma, and the period may play the part of vowels, so far as registration is concerned under certain circumstances. Moreover, since a word may be ended by two hyphens, or by a colon, or a semicolon, these latter are considered as word-ending characters, and may be adapted under certain circumstances to effect registration of the "word" counter analogously to the space-bar. Moreover, since a single numeral or a plurality of numerals between quotation marks are counted as a word, or a letter between quotation marks is counted as a word, connections may be provided whereby the writing of such combined symbols will actuate the register, as for a "word" counter.

To enable these results to be obtained at the requisite speed, and with the desired accuracy, it has been found advantageous to operate the mechanism electrically, the connections being such that certain typewriter key levers each form one contact, and a very thin, high-grade, tempered steel spring for each lever forms the other contact for setting up a registered actuation.

The word "set-up" is used here instead of the word "actuate," because in many cases, to provide for the various possible combinations of writing, it has been found advantageous to have the registering devices operated indirectly through relays, thus making it impossible for heavy or excess currents to be established through the contacts of the registering devices, by the making effective of too many combinations and connections at a given time.

Not only are registers provided for counting key-strokes and indicating their frequency, but the mechanism also includes means for altering the connections in such a way that when the operation transcends the speed of operation for which the registers are adapted to be best used, the registers will indicate on a new basis.

By utilizing relays, it is possible to minimize the current at any given contact, especially at the key levers, where the electrical contact terminals, while positive, must be light enough to make no appreciable change in the "touch" and must not tend to weld together.

If desired, electric lamps may be inserted in parallel with the registers or counting devices, or may replace them, thus enabling the mechanism to be utilized as a display apparatus.

Other features and advantages will hereinafter appear.

In the accompanying drawings,

Figure 1 is a sectional side view of an Underwood typewriting machine, largely diagrammatic, showing my invention as applied thereto.

Figure 2 is a plan view of the line-space lever and a plate adjacent to it used for the electrical connections in word counting.

Figure 3 is a sectional front view of the parts seen in Figure 2.

Figure 4 is a plan view of the parts seen in Figure 1, with most of the typewriter omitted except the universal bar.

Figure 5 is a diagrammatic plan view, showing the electrical connections between the typewriter and the casing containing the counters.

Figure 6 is a perspective view showing the casing and the counters.

Figure 7 is a perspective view of one side of the interior of the casing, showing the mechanical structure of the words counter mechanism.

Figure 8 is a diagrammatic view showing the electrical connections in the casing for the words and strokes counter mechanism.

Figure 9 is a diagram of the electrical connections in the casing seen at the bottom of Figure 1.

In the Underwood typewriting machine, the numeral keys 1, the vowel keys 2, the semicolon key 3, and other character keys 4, when depressed, carry down their respective key levers 5, 6, 7 and 8, so that each key lever will swing upwardly and rearwardly against the platen 9, its own type-bar 9ª effecting this by means of a sub-lever 9ᵇ. The platen 9 is revolubly mounted as usual in a shift-carriage 10 forming part of a typewriter carriage 11, the latter constantly under the tension of a spring drum 12 tending to draw it to the left, and being fed along to the left by means of the usual universal bar 13 which is pivoted on a rocker-frame 14, and is caused to vibrate the usual dogs 15 alternately into engagement with the escapement wheel 16 whenever the universal bar 13 is struck by the heel 17 on the type-bar 9ª actuated at the moment. The platen is adapted to be rotated by the usual line-space lever 18 through the usual slide 19 to varying distances depending on the setting of the control lever 20.

In addition to the keys named above, the machine is provided with the usual space-bar or key 21 on the front end of levers 21ª, which is adapted to feed along the carriage a step at a time by actuating the frame 13. To enable the typist to print by means of either the upper or lower-case types, the shift-carriage 10 is adapted to be shifted from the normal lower-case position to the upper-case position by either of the two usual shift keys 22 and 23, which are effective on their respective key levers 24, said levers 24 being provided with the usual upstanding arms 26 adapted to lift upwardly the shift-rail 27 by rocking a shift-frame 28.

In order to enable the machine to count the type-strokes and other operations accurately, the typewriter frame 30 is mounted on a base 31 having a rearward extension 32, said base containing the direct connections to the typewriter and a large part of the electrical wiring, so that the registering device indicators may be mounted in a separately movable casing or framework 33 for the purposes of exhibition even at a distance, if desired, and may be connected thereto by a small number of connections. The typewriter frame, although mounted on the base 31, is insulated therefrom in a manner and for reasons to be brought out more fully hereinafter.

For the mere counting of the typewriter key-strokes, there is provided in the extension 32 a mounting 34 having thereon an electrical contact device 35 comprising a spring terminal 36 and a fixed terminal 37 connected by a conductor 38 to the "strokes" terminal 39. The spring terminal 36 is connected by a conductor 40 to a switch terminal 146, which, in turn, may be connected by means of the blade 144ª of a switch 144 and another switch terminal 145 with a conductor 42 extending to the positive terminal of a storage battery 43 having advantageously a voltage of six volts, inasmuch as that voltage seems well adapted to operate the mechanism without running any risk of "freezing", viz., temporarily welding together any electrical contacts. The switch is also provided, for a purpose to be brought out more clearly hereinafter, with a center pole or terminal 143 and therefore constitutes a three-terminal switch.

To operate the spring terminal 36 to count the strokes, there is provided a long link 44 extending upwardly and forwardly and comprising a hook or loop 45 detachably hooked over a cross-bar 46 of the rocking frame 14. This link may be formed of a wire and is slidably mounted in a short guide 47 on the mounting 34, and includes a "U" or a lug 48 adapted to overlie the spring terminal 36, with the result that every time the universal bar moves the frame 14 rearwardly, the spring terminal 36 is pushed against the fixed terminal 37, thereby completing, when the switch 144 is closed through the conductors 40 and 38 an electrical connection between the positive pole of battery 43 and the "strokes" terminal 39.

The "strokes" terminal 39 is connected with other parts so as to enable electrical operation of a "stroke" counter 50 and a "stroke" meter 51, both of which are located in the casing 33. Inasmuch as the speed of typewriting may vary greatly, and the time of individual contacts may vary even more greatly, it is found unadvisable to operate either the "stroke" counter 50 or the "stroke" meter 51 directly. At this time, it may be pointed out that the counter 50 is an ordinary mechanical counter and cannot well work above ten or fifteen counts per second, owing to mechanical limitations, and that suitable provisions must be made to enable use of the counter when higher speeds are obtained. The meter 51 utilized is a hot wire measuring instrument fundamentally the same as a hot-wire ammeter but graduated and connected to show the number of strokes producing the current which actuates its needle in a limited space of time, and, therefore, adapted to show at any moment average rate of the immediately preceding strokes.

This possibility of showing the average rate rises from the fact that a hot-wire measuring instrument, depending as it does on a balance of heating and radiation, has a certain lag lasting over nearly two seconds, with the result that the meter substantially averages the current passing during that period.

The readings of the "strokes" meter 51 are obtained by means of a pointer 51ª in connection with a suitably graduated scale having two sets of numbers associated therewith, the readings on one of said sets being double those on the other set for any position of the pointer 51ª when moved from its normal position, pointing to "0". The reason for providing two sets of numbers will be brought out hereinafter.

In order to take care of the maximum change speed of type strokes, two sets of connections are provided from the "strokes" terminal 39, and the other or "common" terminal 82 is treated as a ground for the other end of these electrically-operated devices.

In the ordinary slow operation of typewriting, at say less than ten or twelve strokes per second, the current from the "strokes" terminal 39 on the extension 32 passes through a conductor 53 to a "strokes" terminal 54 on the casing 33, and thence by a conductor 55 to a flexible wire 56, which serves to carry the current on to the removable cover 57 of the casing 33, this cover having only a few pieces of mechanism on its inner face which are arranged in this position for compactness.

From the flexible wire connection 56, the current is led through a single-pole double-throw switch 58, 59, 60, whose function will hereinafter be descirbed. In the usual or slow operation of the typewriting machine, the current runs from conductor 56 on the cover 57 to the pole 59 of the switch, thence to the pole 60 and then on a conductor 61 back into the body of the casing through a second flexible connection 62, and is conveyed by a conductor 63 to a pair of double-pole pulling magnets 64, 65, which are adapted to pull on armatures 66, 67, fast on a swinging frame 68 pivoted above them at 69, so that the lower end 70 of said frame will swing a horizontally extending link 71, and thereby swing the operating arm 72 (Figure 6) of the counter 50, which may be of any suitable type, as indicated above.

Inasmuch as the time of contact between the terminals 36, 37 of the "strokes" mechanism may not be sufficient to give the swinging frame 68 a full oscillation, and also inasmuch as the current through the pulling magnets 64, 65, may be insufficient, or if sufficient, under some circumstances might be so great as to overthrow the arm 72, there is provided means for giving a substantially uniform actuation to the arm or lever 72 of the counter,—uniform both in stroke and speed or time. The means for accomplishing this is substantially like that shown in Figure 7, which is described below in connection with the "words" counter. For the "strokes" mechanism, the connections include a solenoid 73 having a rotating core or armature 74 (say ⅜ inch diameter) which may be driven by a rotating motor 75 at the necessary speed (say 900 R. P. M.), said armature being normally de-magnetized, but adapted to be energized by the solenoid 73. When the solenoid is energized, the armature will draw against its lower surface the horseshoe magnet soft iron frame 76, which embraces the solenoid to engage the ends of the core. The rotating core thus causes the link 71 extending from said frame to drive the counter arm 72. In order to properly energize the solenoid 73, there is provided a relay magnet 77 which is adapted to be energized by any current passing through the "strokes" terminal, and when so energized closes a circuit from the "auxiliary" positive terminal 78 through itself and also through the solenoid, said "auxiliary"

terminal being connected to the positive pole of the battery 43.

The connections for energizing the solenoid 73 include a conductor 79 leading from the conductor 63 and passing through a contact device 80 to the solinoid 73, said contact device being normally closed so that a current from conductor 79 will pass through the solenoid and will be carried by a branch 79ᵃ to the relay magnet 77, the circuit for both solenoid and relay being completed by the conductor 81 connected to the "common" terminal 82. As the frame 68 completes its stroke, it strikes a spring forming one terminal of the contact device or circuit breaker 80, thereby opening the latter and breaking this circuit around the magnet 77. The magnets 64 and 65 remain energized as long as any current flows through the conductor 63. Provision is made whereby the magnet 77 is kept energized until the circuit is broken at contact 80, even if the current ceases to flow through the wire 63. To effect this, the "auxiliary" conductor 78 is adapted to energize the magnet 77 by a circuit normally open at 83, but adapted to be closed by drawing down the armature 84, and to be held closed thereby until the circuit is broken at contact device 80. It will be noted that when the contact device 80 is closed, the magnets 64, 65 and 77 are connected in parallel across the wire 63 and the "common" wire 82, the latter indirectly connected to the negative pole of the battery. When there is no current at contact device 80 or at 83, the frame 68 and link 71 are returned to normal position ready for another stroke, by a spring or springs 84ᵃ.

The pulling magnets 64, 65 hold the link 71 at the limit of its throw if the "strokes" terminals 36 and 37 are held long in contact, thus preventing repeated operations of the link and counter from a single key depression by the breaking of the contact 83. The connections form, therefore, an electro-magnetic full-stroke device for the vibrating arm or frame 68 and the counter-arm operated thereby.

In order to make sure that the residual magnetism on the rotating core or armature 74 will not continue to drag the magnetic frame 76 forward after it has completed its stroke, provision is made on each side of the frame of a thin sheet 85 of some non-magnetic material, such as copper, which is so located that it is brought between the core and the horseshoe frame 76 at the very moment the frame completes its stroke. It will be evident that the limit of the effective stroke may be determined by a stop in the path of frame 76 or one in the path of frame 68. This permits the magnetic frame 76, which is somewhat loosely pivoted at 86 on the swinging frame, to drop down clear of the rotating core 74 until arrested by a pin or its rest 86ᵇ, which projects into an elongated slot in an ear projecting from one of the arms of frame 76 (see Figure 7), and to be swung backward by the springs 84ᵃ at the upper end of the swinging frame overlying the pole magnets, until it strikes the stop 86ᶜ, against which it normally rests.

Not only do the circuit, the swinging frame and the relay connected therewith, form a full-strike mechanism, but they also form a mechanism which keeps the auxiliary current from the "auxiliary" terminal 78 closed substantially the same length of time at every stroke of a key or space-bar. This is due to the fact that the length of time the circuit-breaker is allowed to remain closed is measured by the rotation of the rotating shaft. The fact that this period is substantially uniform enables a hot wire meter 51, above referred to, to be used as a stroke-speed-indicator, because each pulsation of the auxiliary current going through the relay will add to the heat of the actuating wire in the hot wire meter an identical amount. Owing to the fact that these pulsations of current are intermittent, there will be periods when there is no current going through the meter, thus allowing the meter to cool between the pulsations. Owing to the fact that full cooling takes an appreciable length of time, and that such length of time is much greater than the normal time interval between successive pulsations, the ammeter will show the average length of time occupied by the pulsations so long as the current is uniform during the pulsations, and, therefore, the relative rate of pulsations and of the key-strokes which cause them.

When the terminal 59 is connected with the terminal 58 and the operation of the strokes-counter and the strokes-meter is that just described, there is one pulsation of current through the latter at each stroke and the reading on the meter 51 will be taken from the set of numbers giving the lower reading.

The connections to the strokes-meter 51 include a conductor 87 leading from the conductor 79; said conductor 87 going to one pole of the meter, while the other pole is connected to the "common" terminal by means of a conductor 88 in series with a resistance wire 89, to which latter it is connected by means of a slidable contact 90 to adjust the resistance, to bring the meter reading within the desired limits and use little current.

To give a visible indication that the strokes-connections are working correctly in the casing 33, there is provided a strokes-lamp 91 connected in parallel with the pull-magnets by means of a conductor 92 leading from the "common" terminal, and a conductor 93 leading from the strokes-terminal 54. This lamp forms a convenient and simple testing device for showing whether the stroke-circuit is operating properly, and may also be used for demonstrating or advertising purposes.

In order to bring the speed of operation of the typewriter at higher speeds within the limits of operation of the "stroke" counter and the "stroke" meter, there is provided a connection adapted to halve, in effect, the number of strokes upon the typewriter, and this connection is adapted to be made effective by the single-pole double-throw switch 58, 59, 60, above referred to. To throw this device into action, the switch is thrown over so that it connects the "strokes" circuit through the terminal 58 instead of the terminal 60. When this is done, the current pulsations are adapted to alternately energize two relays comprising magnets 94 and 95, respectively. To effect this, the terminal 58 is connected by a wire 96 to a bar 97 against which is slidably mounted a contact piece 98 adapted to slide on rolls 300, and be held by them in electrical contact with the bar 97. In the position shown in the drawings at Figure 8, the contact piece 98 has an ear 301 in such a position that it lies against the upper end of a swinging terminal 302 which is under tension of a spring wire 303, with which it is in electrical contact. When in this position, an electrical pulsation coming through the "strokes" terminal 54 passes through the circuit formed by them and the wire 304 and the winding of the relay 305 and the conductor 306 which is connected to the "common" terminal 82. This energizes the relay, with the result that its armature 307 is drawn down to close a circuit through the wire 308 leading from the "auxiliary" terminal 78, said circuit with the armature drawn down extending through the wire 61 and the conductor 63, which excites the double-pole magnets in the manner just described to actuate the "strokes" counter 50. Not only is the relay 305 energized when the "strokes" pulsation comes through with the parts in the position shown in Figure 8, but also the magnet 95 is energized by a conductor 309 extending from the conductor 304, with the result that its armature 310, which is on the swinging terminal 302, pulls over said swinging terminal, thereby sliding the contact piece or bar 98 against a buffer 311 having a soft leather face 312 adapted to prevent rebound. As a further precaution against rebound, there is provided a detent 313 which is adapted to fall behind a ledge 314 on the bar 98, thus detaining the bar 98 against the buffer 312. When the typewriter key which produced the "strokes" pulsation is allowed to rise, breaking the circuit, a second spring 315, similar to the spring 303, will draw a second swinging contact 316 against a second ear 317, thereby putting the swinging terminal 316 in contact with the second ear 317 of the contact bar 98, with the result that the next pulsation coming through the "strokes" terminal 54 will pass through the conductor 96 and the conductor bar 98 into the spring 315 and be led therefrom by a conductor 318 to the electro-magnet 94, thus pulling the swinging terminal 316 to the left in Figure 8, until the ear 317 strikes against the buffer 319 (like the buffer 311), so that the detent 320 corresponding to the detent 313 may hold the contact bar 98 in its new position.

The circuit through the magnet 94 is completed by a wire 321 extending to the "common" terminal 82, said wire also completing the circuit from the wire 309 through the magnet 95 when that is energized. In order to compel the two swinging terminals 302 and 316 to swing together to effect the operation just described, they are connected together by an insulated coupling, such as a fibre strip 322, which is pivoted to each, so that the system formed by the pair of terminals swings freely, and is normally held in its intermediate position by the springs 315 and 303 opposing each other.

It will be apparent from the foregoing description of operation with the terminal 59 connected with terminal 60 (Figure 8) that the strokes-counter will be actuated only once for two strokes of the keys, and that there will be only one pulsation of current through meter 51 for two strokes. The meter reading must therefore be taken from the set of numbers giving the higher reading and the correct number of strokes may be obtained by multiplying by two the reading on the counter.

Since the motor is small, and may fail to start, there is provided a belt 325 passed around the shaft 326 of the core 74, said belt provided with a handle 327 outside the casing, and having its other end attached to a long spring 328, so that if the handle 327 is pulled, the belt will engage the shaft and turn it while the spring yields, thus starting the motor.

For operating the "words" counter, an almost entirely different set of connections is utilized. The typewriter frame is grounded to the positive pole by a flexible conductor 99 connected at one end with any ordinary screw on the typewriter frame, and at the other with a terminal 31$^a$ on support 31. It should be understood that the frame of the typewriter is insulated from the support 31 and that provision is made of suitable electrical connections between terminal 31$^a$ and the positive pole of battery 43. This is diagrammatically shown in Figure 5, as a wire 99, connected to a grounded battery 99$^c$ (Figure 9). The operating connections include a spring 100 made of thin, high grade, tempered, tinned steel for one lever or for each lever of the space key, and also a somewhat similar spring for the colon and semicolon key, said springs connected to a wire 101 which forms part of a circuit extending through the armature 103 of a relay magnet 102, said armature normally lying against a terminal 104, so that when one of these keys, the space-key 21, for example, is depressed, one of its levers 21ª closes a circuit through the wire 101, the armature 103, the terminal 104, the wire 105, and the wire 106, to the "words" terminal 107. This terminal 107 is connected to electro-magnetically operate the "words" counter 108 through a wire 107ª running to the "words" terminal 109 in the casing 33.

The connections in the casing for operating the "words" counter include the "words" terminal 109 which is connected by a wire 110 to a relay 111, the other end of the circuit comprising a wire 112 extending to the "common" terminal 82. Whenever the space-key is depressed, as above described, it excites the relay 111 and holds it excited as long as the key is depressed and as long as the circuit is closed through the "words" terminal 109.

When the relay 111 is excited, its armature 114 closes a circuit comprising a wire 115 running from the "auxiliary" terminal 78 on the casing, and extending from the armature through a conductor 117 which is adapted to energize the "words" counter double pole pull magnets 118 and 119 and thereby operate the "words" counter by mechanism closely resembling the "strokes" mechanism. The relay 111 prevents any current used in the magnets 118, 119, or mechanism for operating the "words" counter from running into the "words" terminal 107 on the extension. The pull magnets 118 and 119 are connected in parallel across the wire 117 and the "common" terminal 82, and are excited precisely the length of time that a current flows through the terminals 107, 109. To enable the "words" counter to be operated properly, even though the current is closed through the pull magnets 118, 119 too short a time to give a full stroke to the counter operating link, an electro-magnetic full stroke device is interposed, similar to the corresponding device for the "strokes" counter. This enables the magnets 118, 119 to become mere holding magnets to retain the link 120, which operates the "words" counter, at the limit of its throw, in case the contact is held closed so long that there might be danger of a second oscillation of said link by other mechanism.

The means whereby this full-stroke operation is obtained include a relay 121 adapted to be energized by a conductor 122 which excites both the pulling magnets 118, 119 and the relay magnet 121, and has the circuit closed through it by the armature 114. Between the conductor 122 and the conductor 123, which last conductor energizes said relay, there is interposed a normally closed contact 124. From the conductor 123, a conductor 125 extends to the solenoid 126, which is adapted to energize the rotating core 130, with the result that the core draws up against it a horseshoe soft-iron armature 131 and drives said armature along, thereby swinging the frame 133 on which the armature is pivoted, thus driving the link 120 which operates the "words" counter, because it is hooked to the frame 133 at 120ª. When the horseshoe armature 131 is driven substantially to its full extent, it causes the swinging frame 133 to break the contact 124, thereby de-energizing the relay 121 and opening the solenoid circuit 125. If the contact at the relay 111 is still held closed, the pulling magnets 118, 119 will hold the frame 133 in its actuated position until the armature 114 is released, thus preventing a repeated actuation of the "words" counter by accidental repeated actuations of the frame 133.

The core 130 rotates continuously, because it is fast on, although out of magnetic contact with, the shaft on which the rotating core 74 is also fast. In order to make sure that the rotating core 130 drops the horseshoe frame 131, the frame is provided with non-magnetic plates 136, which may be of thin-sheet copper, and so positioned as to come between the core 130 and the magnetic metal of which the horseshoe is formed at the end of the stroke of the frame 133 when the contact 124 is broken, with the result that the residual magnetism of the core is unable to hold the horseshoe plate. It should be pointed out that the circuits which energize the pulling magnets 118, 119 and the relay 121, as well as the relay 111, are completed by wires 130ª electrically connected to the "common" terminal 82. When the frame 133 has completed its driving stroke, it is arrested by a stop 133ª, and drops onto one or more rests or brackets 86ᵇ shown in Figure 7 as pins extending into elongated slots in ears projecting from the branches of armature 131. When the pulling magnets 118, 119 are de-energized, the frame is returned to normal position by springs 134, so that it rests against the stop 134ª.

In order to give a visible indication that the "words" connections are operating correctly, a test or advertising lamp 137 is adapted to be connected in parallel by conductors 138 across the terminals of the pull magnets 118, 119.

As shown herein, the motor is run by a current having approximately eight volts, namely, two volts higher than the current for operating the counters and relays. To obtain this extra voltage for the motor, an extra battery 140 may be interposed between the motor terminal 141 on the extension and the motor terminal 142 on the casing 33, said first terminal 141 being connected to the center pole 143 of the three terminal switch 144, of which the terminal 145 is connected with the pivotal mounting of the switch-blade 144ᵃ and also with the battery 43, and the terminal 146 furnishes current to complete the circuits for the relays on the extension.

So far as the connections have been described up to this point, the "words" counter would simply count the depressions of the space-key or of the keys controlling the same circuit directly. Means, however, are provided for preventing a second actuation of the space-key from being counted until a certain other key or keys are depressed, thus interrupting the current through the "words" terminal 107.

In order to prevent a second immediate actuation of the space-key from being counted, the actuation of that key is adapted to excite a relay 148 to which the wire 105 is attached, said relay having the circuit exciting its magnets completed by a wire 149 extending to the negative terminal 150. The exciting of the relay 148 causes its armature 151 to be drawn down against it, thereby carrying the outer end 152 of said armature clear of the outer end 153 of the armature 154 of a second relay 155, thereby permitting the spring 156 of the armature 154 to carry its armature against a terminal 157, said terminal being electrically connected by means of a wire 158 to the "words" terminal 107. This closes a circuit through the body of the armature 154, because it is electrically connected by means of a wire 172ᵃ, and thence indirectly through a wire 172, a key 285, and a wire 159 to the terminal 146. Attention is called to the fact that the closing of the circuit through the armature 154 causes a continuous current to pass through the "words" terminal 107 after the conductor 106 has had the circuit closed through it by the depression of a key.

In order to release the armature 151 and thereby break the circuit through the "words" terminal 107, connections are provided whereby the depression of any vowel-key will excite the relay 155 and cause the parts to be restored to their normal positions. For this purpose, the vowel-keys, when depressed, are adapted to strike steel springs 163, somewhat similar to the springs 100 and electrically connected to a wire 164, so that the current passing through the wire will excite a relay comprising magnets 165, thereby drawing down the armature 166 of said magnets. In addition to the vowel-keys, the comma, and period keys, as well as the "l" key may be connected to the wire 164— the "l" key because it is used for the numeral "1." The circuit exciting the magnets 165 is completed by a conductor 167 connected by means of an extension 168 to the negative terminal 150. Whenever the relay 165 is excited, its armature 166, engages a terminal 170, so as to close at that point a circuit through a wire 171 leading therefrom, to the coils of the magnets of the relay 155, said coils being also connected at this time with the negative terminal 150 thereby energizing said relay 155 and breaking the current through the "words" terminal 107, as will be pointed out. The armature 166 is electrically connected to the conductor 172, which in turn is electrically connected to the pole 146 of the main switch, through the wire 159, as above described. This current, in passing through the conductor 171, reaches the relay 155, as pointed out above, and by drawing down the armature 154 at the contact 157 the circuit through the "words" terminal 107 and the circuit through the relay 148, and, at the same time, by swinging the end 153 of the armature clear of the end 152 of the armature 151 allows the armature 151 (which has been locked down by the armature 154) to be sprung to de-energized position by its spring 173, thereby swinging the end 152 in front of the end 153 with the result that the armature 154 is locked clear of the terminal 157, thus breaking the current, through the terminal 107 as stated above. Upon the release of the vowel-key, the circuit is broken at its spring 163 and the armatures 151 and 154 will be left in their normal positions.

To minimize the consumption of current, provision is made of means to prevent energization of the relay 155 by depression of a vowel-key when the armature 154 is locked against movement away from its relay magnet by means of armature 151. To this end, the circuit around the magnets 155 which comprises the wire 171, includes a wire 174 connected to a normally open terminal 175. Adjacent the terminal 175 is a second terminal 176 connected by a wire 177 to the negative pole 150. Thus the circuit for exciting the magnets 155 is normally open at the terminals 175, 176. The opening between the terminal is bridged by the actuation of the space-key, which by exciting the relay 148 and drawing down the armature 151, causes a section 178, mounted on said armature but insulated therefrom to bridge the space between the two terminals 175 and 176, thereby completing the connection from the wire 171 through the relay 155 to the negative pole 150. Since the armature 151 is normally held locked in its depressed position by the end 153 of the armature 154, it will be seen that the bridge 178 in the circuit 171, 175, 176, and 177 is held effective when once effective, but is made ineffective or opened after the writing of the first vowel in any word, with the result that current is not wasted by holding the relay 155 continuously closed, or by repeatedly actuating it in writing a single word.

To enable the actuation of the line-space lever 18 at the end of a line to register thereby the completion of a word in the same way that the actuation of the space-key ordinarily does between words, there is held to the carriage of the typewriter by suitable screws a non-conducting plate 179, instead of the usual plate which overlies the line-space lever, and this plate comprises terminals 180 and 181, which are adapted to be closed by the actuation of the line-space lever, and thereby send a current through the "words" terminal 107, as will now be described. To enable this to be done, there is provided a flexible cord 179ª extending from the plate 179 to the extension on which the typewriter is mounted, said cord comprising two conductors 182 and 183, the first of which, 182, may be connected to the positive switch terminal 146, while the other, 183, is connected by a wire 185 to the winding around a relay magnet 186, so that said relay may be excited by the current flowing through the conductor 185, since the circuit is completed by a wire 187 connected to the negative terminal 150.

The excitation of the relay 186 is adapted to send the current through the "words" terminal 107 to actuate the "words" counter. To accomplish this, the armature 188 of the relay 186, when drawn down, is adapted to engage a conductor 189 forming the end of a wire 190, which (through the wire 101) is electrically connected to the armature 103 of the above-described magnet 102, which, it will be remembered, forms part of a circuit for sending a current through the "words" terminal 107. The other side of the circuit, of which the wire 190 forms a part, comprises a wire 191 electrically connected to the armature 188, and in turn electrically connected to the positive terminal 146 of the main switch.

Since the actuation of the line-space lever at the end of a line does not necessarily mark the end of a word, inasmuch as a word may be ended in a hyphen and be continued on the next line, connections are provided whereby the hyphen-key, when actuated immediately before the line-space lever, may modify the action thereof. To effect this, the hyphen-key, when actuated, strikes its spring 163, which is electrically connected to a wire 192, so as to close a circuit through the armature 193 of a relay magnet 194, said circuit passing through a terminal 195 against which the armature normally lies, said terminal being connected by a conductor 196 to the armature 197 of another relay magnet 198, so that the current may pass through the normally closed terminal 199 against which armature 197 normally rests, to a conductor 200 and a wire 201 forming a continuation thereof, to indirectly open at the terminal 104 the connection with the "words" terminal, thereby preventing actuation of the "words" counter by the line-space lever immediately after actuation of the hyphen-key.

In order to avoid the necessity for too heavy a current through the circuit including conductor 200 and to enable the hyphen-key to be used for other purposes, and at other times than for hyphenating a word at the end of a line, the circuit comprising the conductor 200 does not directly actuate the relay to break the "words" circuit at 104, but is adapted to excite a relay magnet 202, the other side of which is connected by a wire 202ª indirectly to the negative terminal 150. When thus excited, the relay magnet 202 draws down its armature 203 pivoted near its middle where the conductor 207 joins it, thus swinging in the opposite direction the free end of the armature 203 until it engages the contact 204, with the result that the conductor 205 extending therefrom will excite the relay 102, because the winding of said relay 102 forms part of a circuit comprising a conductor 206 connected to the negative pole 150, and the conductor 207 electrically connecting the armature 203 to the positive terminal 146.

This exciting of the relay 102 draws down its armature 103, thus breaking the above-described contact in the "words" circuit at 104. The armature 103 is locked in this position, because, when drawn down against its relay 102, it allows the armature 208 of the relay magnet 209 to be swung out by its spring 210. From this it will appear that the actuation of the hyphen-key, by breaking the "words" circuit at 104, prevents the ensuing actuation of the line-space lever 18 from closing the "words" circuit. As will be more fully described hereinafter, actuation of the line-space lever immediately after actuation of the hyphen-key will cause armature 103 to be restored to its normal position in engagement with terminal 104.

In order that the writing of a compound word in the middle of a line and divided by a hyphen may be counted as two words, the writing of a vowel after the actuation of the hyphen-key is adapted to cause the closing of the "words" circuit. To accomplish this, the relay magnet 202 is de-energized on the release of the hyphen-key, thus allowing its armature 203 to swing a contact 211 thereon against the contact 212 on the overlying armature of the relay magnet 102, said latter armature being in the meantime held depressed by the armature 208. The closing of the contacts 211 and 212 causes the current from the conductor 207 to pass through the armature 203, the armature 103, and thence through the wire 101 to a wire 213 adapted to excite the relay magnet 198, and also by part of the wire 101, through a wire 213ᵃ adapted to excite a relay magnet 214 connected in parallel with the relay magnet 198. This is possible because the opposite side of the circuits around the relays 198 and 214 passes through a wire 215 having a terminal 216, which is now in contact with a terminal 217 on the armature 208, with the result that the current passing from the wire 215 will pass through the wire 217ᵃ electrically connected to the armature 208, and thence to the negative pole 150. The relay magnets 198 and 214 are adapted to stay energized upon the release of the hyphen-key, and as will be seen, the armature 218 of the relay magnet 214, when the latter is energized, closes an insulated contact-piece 219 across the terminals 220, 221 and 229, the first being connected to the negative pole 150 by the wire 168, the second being connected by a wire 222 to the terminal 216, and the third being connected by a wire 228ᵃ to the coils of the relay magnet 209. In addition to bridging the contacts 220, 221, and 229 the armature 218 is adapted to make an electrical contact itself with another contact-piece 223, which is connected by a wire 224 to the "words" terminal 107. This closes at this point a circuit which is always open unless a vowel is written while the relay magnet 214 is energized, since the only way any circuit can be completed through the wire 222 is by means of a wire 225 connected electrically to the armature 218 and having a terminal 226 adapted to form an electric contact with the armature 166 whenever a vowel-key is depressed. It will be seen, therefore, that when the vowel-key is depressed, after the hyphen-key, a circuit will be closed through the terminal 226, the wire 225, the armature 218, and the wire 224 to actuate the "words" counter.

In addition to actuating the "words" counter in this way, the actuation of the vowel-key at this time is adapted to excite the magnet 209, thus breaking the contact between the terminals 217 and 216, and de-energizing the relays 198 and 214. To do this, the armature 166 (which is depressed by the actuation of the vowel key) closes a circuit through the terminal 227 connected by a wire 228 to the winding of the relay 209, the opposite end of the circuit comprising the wire 228ᵃ connected to the terminal 229 at the closed armature 218. Thus, the circuit is completed, since the hyphen-key has left the contact-piece 219 in contact with the terminals 229 and 220, the latter connected by a wire 247 to the negative pole 150.

If a hyphen is written at the end of a line, the actuation of the line-space lever should release the relays 198 and 214 and release the armature 103 from its locked position, so that the next operation of a space-key will effect the registration of a word. To effect this, there is provided, at the relay 186, a terminal 230 adapted to form a circuit when the armature 188 is drawn down by its relay magnet 186 at the actuation of the line-space lever, said terminal extending in the wire 231 to the winding of the relay magnet 209 through the wire 228, with the result that the actuation of the line-space lever will energize the relay magnet 209, thus drawing down its armature, breaking the contact at 217 and allowing the armature 103 to spring out under the influence of its spring 232 to normal position. This breaks the circuit formed by the wire 215, which has been energizing the relay magnets 198 and 214, with the result that the armatures of the latter are released, and the circuits formed thereby are broken.

As will appear from the connections explained more fully below, the relay 209 would be energized at every key-stroke if its circuit were not normally open at the contact-piece 219. Thus, the contact 219 forms a current-saving device, eliminating both the waste and the noise incident to the operation of the machine which would otherwise occur, especially at the relay 209.

In order that a second operation of the hyphen-key may be counted as a word if the hyphen-key is operated twice, connections are provided whereby the armature 197, while depressed, electrically connects the hyphen-key to the "words" terminal. For this purpose, there is provided a terminal 234 connected to the "words" terminal and with which the armature 197 of the relay 198 is in electrical contact as long as the relay magnet 198 is energized. From the terminal 234 extends a wire 235 electrically connected by the wire 105 to the wire 106, with the result that after the first depression of a hyphen-key, the second depression will close a circuit through its wire 192, the armature 193, the wire 196, and the armature 197, continuing through the terminal 234 and the wire 235, thus energizing the relay 148. This leaves the armature 151 locked down, thus preventing the counting of a third actuation of the hyphen-key. Then the next actuation of a vowel-key will depress the armature 166 releasing the armature 151, and at the same time, the contact 227, struck by the armature 166, closes a circuit through the wire 228 to excite the relay 209.

To hold down the armature 103 of the relay 102 at the time of depressing the vowel-key, there is also provided for the relay 165 a contact 238 which closes a circuit through a wire 239 connected to a terminal 240 at the relay 198. When the armatures 197 and 218 are held down, after the hyphen-key has been actuated, the circuit through the terminal 238, wire 239, and terminal 240 to the wire 105, excites the relay 102. This is possible because, when the armature 197 is depressed, the terminal 240 is connected with the terminal 242 by means of an insulated bushing 241 on the armature 197, and the terminal 242 is connected by a wire 243 adapted to energize the relay 102. Moreover, the armature 218 holds itself down at this time, since its terminal 220 is bridged to its terminal 221, thereby closing a circuit through conductor 101, relay 103, terminals 212, 211, and conductor 207. Thus, this circuit excites the relays 214 and 198 to hold down their armatures 218 and 197. At the rise of the vowel-key and the upspringing of the armature 166, the current exciting the relay 102 is broken at terminal 238, and the current exciting the relay 209 is broken at the terminal 227. Thus, their relays rise in the order named, for reasons which will be set forth later.

If the line-space lever is actuated after the hyphen-key, and energizes its relay 186 and draws down its armature 188, as above described, it excites the relay 209. To prevent this from allowing the armature 103 to close the contact 104, the relay 186 causes its armature 188 to close a circuit through the terminal 244 connected by the wire 239 to the terminal 240, above described, with the result that actuation of the line-space lever, under these circumstances, energizes the relay 102 precisely as does the actuation of a vowel key.

The relay 209 is described as being normally idle, and is adapted to be energized at the depression of the hyphen-key. It is to prevent actuation or energizing of this relay at every depression of any key which is electrically connected to the registering mechanism that the connections between the winding of the relay 209 and the negative pole 150 include the wire 228$^a$ extending down to the terminal 229 at the armature 218, which is normally held clear of the terminal 220 of the wire 247 which goes to the negative pole 150. Thus, the circuit through the winding of the relay 209 is normally broken, with the result that it is only energized after having been first reset from its normal position by the actuation of the hyphen-key, which, as described above, on its up stroke energizes the relay 214 and thereby closes the circuit 245, 219, 220, 247.

In order that the hyphen-key may not energize these connections in upper-case, in which case it writes a parenthesis, the shift-keys 22 and 23, when depressed, are adapted to strike thin steel springs 248, like the steel springs 163, thereby closing a circuit through a wire 249 to excite the relay 194, and thereby draw down its armature 193, thus breaking the hyphen-key circuit at 195. The circuit through the wire 249 and the winding is indirectly connected to the negative pole 150 by a wire 250.

The number keys (except the "6" key), when depressed, are adapted to cause their key-levers 5 to strike steel springs 163 connected to a wire 251, thereby closing a circuit to energize a relay 252, and drawing down the armature 253 thereof to close circuits much like those closed by the armature 166. It will be seen that the coils of the relay 252 are connected with the negative pole of the battery by wires or conductors 261, 167 and 168. When the armature 253 is thus drawn down, it is held down because an insulated sleeve 254 on it electrically connects a terminal 255 to a terminal 256, so that the latter, which is connected to the wire 251 by a wire 257, will energize the relay winding 252, inasmuch as the terminal 255 is connected to a normally live wire 258. To make it normally live, the wire 258 extends to a terminal 259 against which the armature 151 normally lies, said armature being connected to the switch terminal 146 by a wire 260, the wire 172$^a$, a wire 289, the wire 172 and the wire 159. The other side of the circuit of the relay 252 is completed as described above.

The closing of the relay 252 energizes the relay 155 to register a word in the same way that the relay 165 registers one, there being provided at the armature 253 a terminal 263 connected by a wire 264 to the wire 171. This energizes the relay 155, because the circuit through 263 is closed by an insulated bushing 266 on the armature 253, said bushing adapted to strike a terminal 265 connected indirectly by a wire 267 to the switch terminal 146. These circuits, therefore, provide means whereby the relays 148 and 155 are alternately operated if these circuits are closed alternately with the space-key circuit, since after the relay 148 has been energized by the operation of the space-key, the actuation of a number key closes the circuit through the "words" terminal 107, thus closing the contact 259. This closing holds the relay 252 energized and prevents the depression of a second number key from being counted as a word.

In order to enable a hyphen written at the beginning of writing a number to be utilized as a word ending and registering element, there is provided at the relay 252 a terminal 268 connected by a wire 269 to the winding of the relay 209, so that if the circuit through the winding of the relay 209 is elsewhere closed, the drawing down of the armature 253 will close a circuit through that relay 209 and restore the armature thereof and the devices controlled thereby to normal position.

In order that the writing of a hyphen between two numbers may not be registered as a word, since fractions are often written thus, the circuit through the relay 202 is carried through the terminal 270 against which the armature 253 normally lies, with the result that the circuit for energizing the relay 202 is normally closed adjacent the relay 252, but is broken at that point upon actuating a numeral key, thus preventing the actuation of the 202 relay, and thereby preventing the actuation of the mechanism controlled thereby at the writing of a hyphen. The winding of the relay 202 is connected to the terminal 270 by a wire 271.

Inasmuch as the upper-case characters on the numeral keys are treated as numerals by the relays herein described, the writing of such marks as quotation marks or parentheses around any ordinary letter will cause the actuation of the writing of that letter with its quotation marks to be counted as a word, this being true even if the writing of the character itself has no effect on the relay mechanism, because the quotation marks have the effect of writing of a numeral.

To provide means whereby the underscoring of a letter shall not be effective as if it were a numeral (which would be the case unless special connections were provided, since it is in the upper-case of "6"), there may be provided a special wire 272, connecting the springs 163 for the "5" key and the "7" key, which are connected with the numeral keys to the left of the "5" key and to the right of the "7" key but disconnected from the spring for the "6" key. To have its actuation computed like the other numeral keys in the lower case, the "6" key spring 163 may be connected by a wire 273 to a contact 274 at the armature 275 of a relay 276, the remainder of the circuit being completed by a wire 277 electrically connected to the wire 251. With the connections standing in this way, the depression of the "6" key will close the circuit through the wire 251 precisely as does the depression of any other numeral key. In order that the depression of the "6" key in the upper case may be ineffective to close a circuit through the wire 251, the armature 193 (which, it will be remembered, is drawn down at the actuation of a shift-key) may close a normally open circuit from the positive terminal 145 to the negative pole 150 around the relay 276, with the result that said relay breaks the contact 274, so that the depression of the "6" key at that time will be without result. The connections for effecting this include a terminal 278 electrically connected by a wire 279 to the winding of the relay 276, with the result that when the insulated end 281 of the relay strikes the terminals 278 and 280, which latter is connected by the wire 172, as above described, to the switch terminal 146, the relay 276 will be energized thereby breaking the circuit 274.

In order that the writing of the parenthesis on the upper case of the hyphen-key may have precisely the effect of writing the parenthesis on the upper case of the "9" key, there is provided a terminal 283 connected by a wire 284 to the wire 273 and adapted to be struck by the inner end of the armature 193. This makes the upper case hyphen circuit identical with the numeral key circuit at the relay 252.

It will be observed the connections are such, that if in writing two hyphens, the key is not raised far enough to give two separate electrical impulses, the writing of the first vowel in the next word will give the required registration.

In order to prevent incomplete depressions of the space-bar (which sometimes occur by accident in writing on the lowest bank of keys) from registering words improperly, the contact springs of the space-bar are shorter than those of the keys, so that substantially a complete actuation of the space-bar is required to close the circuit through it. To make sure of the contact there is provided a separate contact spring for each end of the space bar.

In the connections hitherto described, the order of operation of the relays will for the most part be apparent. The only precaution likely to be overlooked in the timing of relays which are depressed or released nearly simultaneously is to be observed in connection with the relays 102 and 209, in connection with which it should be observed that the relay 102 must be de-energized before the relay 209 is de-energized, in order to make sure that the armature 103 can lock the armature 208 down. It will also be observed that the end of the armature 208 is electrically insulated in such a way that when it is in contact with the armature 103 no current will flow between them.

Inasmuch as under some circumstances when a key is released the current holds some of the relays energized, thus running down the battery or unnecessarily using up power, a device is provided to be operated at the close of writing to make sure that everything is disconnected, said device being shown as a push button or key 285 with normally open terminals 286 and 287, which are adapted, when brought together, to close a circuit through the wire 288 which is electrically connected to the negative terminal 150, through the winding of the relay 165 and the wires 167 and 168. The other side of the circuit will vary with the relays effective, and is connected to the wire 172 by the wire 289. Normally the push button holds the terminal against the end of the wire or conductor 172*, thus connecting the conductor 172* to the conductor 159 by means of wires 289 and 172. Depression of the button 285 breaks any circuit through the terminal 255 which may be holding its relay 252 excited.

In order to give a visible indication that the registering current is being properly controlled, there is provided an indicator or advertising light 290 connected by a wire 291 to the "common" terminal 292 and having its other leading wire 293 connected to the "words" terminal 107, with the result that all the time there is a current passing through the "words" terminal the light 290 will be lit. For exhibition purposes, the lamp 290 may be replaced by or placed in parallel with a relay adapted to control a 110-volt lamp 294 (Figure 5), which will operate satisfactorily if a nitrogen gas-filled lamp of say 25-watt capacity is used. The connections for this include two lead wires 295 suitably connected to a relay 296.

It will be observed that in a number of cases, a relay makes two contacts through two wires, when it might make a contact only through one wire, so that the latter could be later split into two conductors. This structure has been adopted in order to minimize the amount of sparking at the contacts, it having been found that with a six-volt battery the contacts need not be expensive platinum contacts if the circuits are laid out as shown in the accompanying drawings. The various relays are wound to have a resistance of about four ohms, and their cores are energized far above their saturation points by the current employed, thus giving the requisite rapidity of action.

The relay 252, which is operated directly by the circuit closed by the key depression, may be regarded as a primary relay, and the relay 155 may be regarded as a secondary relay. The relays 102 and 202, which might be merged in certain forms of the device, may be regarded together as a primary relay, or as a primary and secondary relay, and the relays 198 and 214, which are controlled largely by the relay 102, may be regarded either as secondary or tertiary relays, depending on how the relay 102 is regarded.

As illustrated in Figure 4, the base may include sockets 329 into which the usual feet of the typewriter frame may fit when covered with the usual rubber bottoms. The usual rubber bottoms insulate the typewriter frame from the base when seated in the sockets. The typewriter can be removed by merely disconnecting the link 44 and disconnecting the flexible cords 183 and 99, and then lifting its feet out of the sockets.

For convenience the "auxiliary" terminal 70 is connected by a conductor 330 to an "auxiliary" terminal 331 on the extension, where it is connected by a conductor 332 to the switch terminal 146.

In order to be able to start the current in the relays 305, 94, 95 (Figure 8) in case neither contact arm 302 nor 316 should be in contact with the slide 98 as a result of jarring while shipping, there is provided a push button 333 which, when depressed, closes a normally open circuit from the wire 308 to the wire 309, thereby exciting the magnet 95 to draw the contact arm 302 to the right, and thereby draw the bar 98 to the right. When the push button 333 is released, the spring 315 draws contact arm 316 to the left into contact with the ear or lug 317, thereby enabling the relay magnet 94 to be excited at the first key-stroke.

Variations may be resorted to within the scope of the invention, and portions of the improvements may be used without others.

Having thus described my invention, I claim:

1. The combination with a typewriting machine comprising keys and a space-bar, of a hyphen-key, and a counting mechanism adapted to be actuated by alternate action of said first-named keys and said space-bar or said hyphen-key.

2. The combination with a typewriting mechanism including a plurality of vowel keys, of a line-space mechanism, a space-bar, a hyphen-key, a counting mechanism, means whereby actuation of the space-bar following any of the first-named keys will actuate said counting mechanism, and means whereby actuation of the first-named keys, followed by actuation of the hyphen-key, and then followed by actuation of the first-named keys, will actuate the counting mechanism.

3. The combination with a typewriting mechanism including a plurality of keys, of a line-space mechanism, a space-bar, a hyphen-key, a counting mechanism, means whereby actuation of the space-bar following any of the first-named keys will actuate said counting mechanism, means whereby actuation of the first-named keys, followed by actuation of the hyphen-key and then followed by actuation of the first-named keys, will actuate the counting mechanism, and means whereby actuation of the line-space mechanism, after the hyphen-key, is ineffective to actuate the counting mechanism unless followed by actuation of one of the first-named keys and space-bar.

4. The combination with a typewriting mechanism, of numeral printing keys, other printing keys, a space-bar, a counting mechanism on which said other printing keys are ineffective, and means whereby actuation of the space-bar after a numeral key actuation actuates the counting mechanism.

5. The combination with a typewriting mechanism, of numeral printing keys, other printing keys, a space-bar, a counting mechanism, means whereby actuation of the space-bar after a numeral key actuation actuates the counting mechanism, vowel printing keys, a hyphen-key, connections whereby the actuation of the hyphen-key between two vowel keys actuates the counting mechanism, and connections whereby the actuation of the hyphen-key between two numeral keys is ineffective on the counting mechanism.

6. The combination with typewriting mechanism including vowel keys, of a hyphen-key, a counting mechanism, connections whereby actuation of the hyphen-key between two vowel keys is effective to actuate the counting mechanism, connections whereby two actuations of the hyphen-key are effective to actuate the counting mechanism, and connections whereby the first and third successive actuations of a hyphen-key are ineffective to actuate said counting mechanism.

7. The combination with typewriting mechanism including a space-bar and printing keys, of a counting mechanism adapted to be actuated by alternate actuations of the space-bar and the printing keys, and connections whereby a double actuation of either the space-bar or the printing keys, unaccompanied by the alternate action of the other, is ineffective to actuate the counting mechanism.

8. The combination with typewriting mechanism comprising a hyphen-key and other character printing keys, of a case-shift mechanism, a counting mechanism, and means ineffective at the operation of said other keys, whereby said hyphen-key is effective on said counting mechanism in a manner controlled by said case-shift mechanism.

9. The combination with typewriting mechanism comprising character printing keys, of a case-shift mechanism, a counting mechanism, and means whereby one key is effective on said counting mechanism in a manner controlled by said case-shift mechanism and other keys are ineffective thereon.

10. In a typewriting machine, the combination with an escapement mechanism and keys for actuating it, of a key-stroke counting mechanism, and means for indicating concomitantly with the actuation of the key-strokes the rate of speed of said strokes.

11. The combination with typewriter keys and an electrical contact adapted to be operated thereby, of a counter adapted to be operated by said contact to count the strokes of said keys.

12. The combination with typewriter keys and an electrical contact adapted to be operated thereby, of a device controlled by said contact and adapted to show the frequency of operation of said keys.

13. The combination with a device having reciprocating parts, of a normally-open circuit comprising an electrical contact device adapted to be closed by the reciprocation of any of said parts, means to render of uniform duration the pulses of current produced by the closing of said contact device, regardless of the duration of such closures, and means operated by the current passing therethrough for showing the rate of such pulsations.

14. The combination with a device having reciprocating parts, of a normally-open circuit comprising an electrical contact device adapted to be closed by the reciprocation of any of said parts, means to render of uniform duration the pulses of current produced by the closing of said contact device, regardless of the duration of such closures, and a counting device operated by such pulsating current passing therethrough.

15. The combination with a device having reciprocating parts, of a normally-open circuit comprising an electrical contact device adapted to be closed by the reciprocation of any of said parts, means for making of uniform duration the pulses of current produced by the closing of said contact device, a device for automatically creating a less number of current pulsations bearing a definite relation to the number of closures of said contact device, and a counting device operated by the current having said less number of pulsations.

16. The combination with typewriting mechanism, of printing keys including vowel-keys, a space-bar, a counting mechanism, and means controllable by a limited number only of said printing keys, the vowel-keys being included in such limited number, whereby a complete actuation of said counting mechanism may be effected by an actuation of the space-bar followed by the actuation of a vowel-key.

17. The combination with typewriting mechanism comprising type-keys including a hyphen-key and case-shift mechanism, of a counting device controllable in part by said hyphen-key, and means controlled by the case-shift mechanism to modify the hyphen-key-control of the counting device.

18. In a device having a reciprocating member, the combination with a circuit adapted to be closed by said member, of a constantly revolving shaft, an electric measuring device adapted to be excited during a definite period of rotation of said shaft, and means whereby said circuit makes said shaft effective to uniformly actuate said measuring device each time it is made effective.

19. The combination with a counter, of an electric circuit adapted to be closed to actuate said counter, a constantly driven shaft, connections whereby said circuit causes said shaft to actuate said counter, and connections whereby said shaft is thus made effective once only at each closing of said circuit and is released at the end of a period of actuation, irrespective of whether said circuit is open or not.

20. The combination with a pulsating current circuit, of a counter, a link for actuating said counter, a rotating shaft carrying a normally de-energized armature, and means for energizing said armature from said circuit to cause the shaft to operate said link.

21. The combination with a circuit having a pulsating current, of a counter, a rotating shaft, a normally de-energized armature rotating with said shaft, a subsidiary armature attracted against said first-named armature when excited, and a link attached to said subsidiary armature and operating the counter.

22. The combination with a circuit having a pulsating current, of a counter, a rotating shaft, a normally de-energized armature rotating with said shaft, a subsidiary armature attracted against said first-named armature when excited, a link attached to said subsidiary armature and operating the counter, and a non-magnetic plate automatically brought between said armatures at the conclusion of a counter-operating stroke to separate said armatures.

23. The combination with a circuit having a pulsating current, of a counter, a rotating shaft, a normally de-energized armature rotating with said shaft, a subsidiary armature attracted against said first-named armature when excited, a link attached to said subsidiary armature and operating the counter, a solenoid for energizing said shaft armature, and a circuit for energizing said solenoid adapted to be broken at the end of a stroke of the link.

24. The combination with a circuit having a pulsating current, of a counter, a rotating shaft, a normally de-energized armature rotating with said shaft, a subsidiary armature attracted against said first-named armature when excited, a link attached to said subsidiary armature and operating the counter, a non-magnetic plate automatically brought between said armatures at the conclusion of a counter-operating stroke to separate said armatures, a solenoid for energizing said shaft armature, and a circuit for energizing said solenoid adapted to be broken at the end of a stroke of the link.

25. In combination, a measuring device, a controlling member therefor mounted for movement in a stroke of definite length, an actuating circuit for said device and member, a relay whereby the energizing of said circuit may be effected, and a full-stroke electrical device for said member rendered effective by said relay.

26. In combination, a counter, a normally rotating shaft, a hollow core mounted on said shaft to turn therewith but insulated therefrom, an electric circuit for energizing said core, an armature to be actuated by said core when energized, connections between said armature and said counter, whereby the former may actuate the latter, and means for breaking said circuit when said armature has been actuated to a predetermined extent.

27. The combination with a circuit having a pulsating current, of a swinging frame comprising an armature, a pulling magnet adapted to be energized by said current, a relay also adapted to be energized by said current, a make-and-break connection in the circuit of said relay adapted to be opened by said swinging frame when fully swung, and a circuit closed by said relay and passing through said make-and-break connection to keep the relay excited irrespective of the pulling magnet.

28. The combination with a circuit having a pulsating current, of a swinging frame comprising an armature, a pulling magnet adapted to be energized by said current, a relay also adapted to be energized by said current, a make-and-break connection in the circuit of said relay adapted to be opened by said swinging frame when fully swung, a circuit closed by said relay and passing through said make-and-break connection to keep the relay excited irrespective of the pulling magnet, and a counter actuated by said swinging frame.

29. The combination with a circuit having a pulsating current, of a swinging frame comprising an armature, a pulling magnet adapted to be energized by said current, a relay also adapted to be energized by said current, a make-and-break connection in the circuit of said relay adapted to be opened by said swinging frame when fully swung, a circuit closed by said relay and passing through said make-and-break connection to keep the relay excited irrespective of the pulling magnet, a constantly rotating shaft, an armature fast to said shaft, a solenoid for exciting said armature in circuit with said relay, and a secondary armature fast to said frame adapted to operate the frame by adhesion to said shaft armature.

30. The combination with a circuit having a pulsating current, of a swinging frame comprising an armature, a pulling magnet adapted to be energized by said current, a relay also adapted to be energized by said current, a make-and-break connection in the circuit of said relay adapted to be opened by said swinging frame when fully swung, a circuit closed by said relay and passing through said make-and-break connection to keep the relay excited irrespective of the pulling magnet, a constantly rotating shaft, an armature fast to said shaft, a solenoid for exciting said armature in circuit with said relay, a secondary armature fast to said frame adapted to operate the frame by adhesion to said shaft armature, and a counter operated by the swinging frame.

31. The combination with a circuit having a pulsating current, of a swinging frame comprising an armature, a pulling magnet adapted to be energized by said current, a relay also adapted to be energized by said current, a make-and-break connection in the circuit of said relay adapted to be opened by said swinging frame when fully swung, a circuit closed by said relay and passing through said make-and-break connection to keep the relay excited irrespective of the pulling magnet, and an electrical measuring device having a lag extending over a period of several pulsations adapted to be excited by said relay circuit.

32. In combination, a counter, a normally rotating shaft, a hollow core mounted on said shaft to turn therewith but insulated therefrom, an electric circuit for energizing said core, an armature to be actuated by said core when energized, said armature being mounted so that, when brought into contact with said core, it will be advanced by the latter by rolling contact therebetween, connections between said armature and said counter, whereby the former may actuate the latter, and means for releasing said armature from said core, comprising means for breaking said circuit after said armature has been driven a predetermined distance, and non-magnetic material positioned on said armature, so as to separate the core and the armature when the latter has been advanced said predetermined distance to separate the armature from the core, so as to prevent the former being held against the latter by residual magnetism.

33. The combination with a pulsating current, of a measuring device for said current, means interposed between the current and the measuring device for eliminating alternating pulsations, said means comprising a pair of magnets adapted to be alternately excited by said pulsations, and a relay for operating said measuring device connected to one magnet and not with the other.

34. The combination with a pulsating current, of a measuring device for said current, means interposed between the current and the measuring device for eliminating alternating pulsations, said means comprising a pair of pulling magnets, a slidable contact bar adapted to be yieldingly detained in either of two positions, a fork adapted to be alternately pulled by said magnets to contact with said contact bar, means yieldingly holding said fork at an intermediate position, electric circuits operated by said contact bar through said fork to cause the magnets to alternately shift said fork, and a relay adapted to be actuated when one of said magnets is actuated and idle when the other magnet is actuated.

35. The combination with a pair of magnets adapted to be alternately actuated, of a contact bar controlled thereby, ears on said contact bar, a fork operated by said magnets for shifting said contact bar by said ears, and a detent for holding said contact bar at either end of its throw in contact with an ear.

36. The combination with a pair of magnets adapted to be alternately actuated, of a contact bar controlled thereby, ears on said contact bar, a fork operated by said magnets for shifting said contact bar, a yielding buffer for arresting said contact bar at either end of its throw, and a detent adapted to hold the bar against its buffer.

37. The combination with a typewriting machine including a space-bar, of a words-counting electric circuit adapted to be closed by the actuation of said space-bar and to be held closed thereby.

38. The combination with a typewriting machine including a space-bar, of a words-counting electric circuit adapted to be closed by the actuation of said space-bar and to be held closed thereby, a printing key also forming part of said typewriting machine, and a circuit closed by said printing key for opening said words-counting circuit.

39. The combination with a typewriting machine including a space-bar, a printing key and a line-space lever, of a words-counting electric circuit adapted to be closed by said space-bar, a circuit adapted to be closed by said printing key to open said counting circuit, and means adapted to be actuated by said line-space lever for closing said words-counting circuit.

40. The combination with a typewriting machine including a space-bar, a printing key and a line-space lever, of a words-counting electric circuit adapted to be closed by said space-bar, a circuit adapted to be closed by said printing key to open said counting circuit, means adapted to be actuated by said line-space lever for closing said words-counting circuit, another printing key for said typewriter adapted to print a hyphen, and a circuit adapted to be closed by said hyphen-key to cause the next operation of the first printing key to close the words-counting circuit.

41. The combination with a typewriting machine including a space-bar, a printing key and a line-space lever, of a words-counting electric circuit adapted to be closed by said space-bar, a circuit adapted to be closed by said printing key to open said counting circuit, means adapted to be actuated by said line-space lever for closing said words-counting circuit, another printing key for said typewriter adapted to print a hyphen, a circuit adapted to be closed by said hyphen-key to cause the next operation of the first printing key to close the words-counting circuit, and means whereby operation of the line-space lever closes the circuit to make the previously closed hyphen circuit ineffective.

42. The combination with a typewriting machine including a space-bar, a printing key and a line-space lever, of a words-counting electric circuit adapted to be closed by said space-bar, a circuit adapted to be closed by said printing key to open said counting circuit, means adapted to be actuated by said line-space lever for closing said words-counting circuit, another printing key for said typewriter adapted to print a hyphen, a circuit adapted to be closed by said hyphen-key to cause the next operation of the first printing key to close the words-counting circuit, a case-shift mechanism, and connections operated by the case-shift mechanism for making the hyphen-key ineffective on its circuit.

43. The combination with a typewriting machine including a space-bar, a printing key and a line-space lever, of a words-counting electric circuit adapted to be closed by said space-bar, a circuit adapted to be closed by said printing key to open said counting circuit, means adapted to be actuated by said line-space lever for closing said words-counting circuit, another printing key for said typewriter adapted to print a hyphen, a circuit adapted to be closed by said hyphen-key to cause the next operation of the first printing key to close the words-counting circuit, means whereby operation of the line-space lever closes a circuit to make the previously closed hyphen circuit ineffective, a case-shift mechanism, and connections operated by the case-shift mechanism for making the hyphen-key ineffective on its circuit.

44. The combination with a typewriting machine including a space-bar, a printing key and a line-space lever, of a words-counting electric circuit adapted to be closed by said space-bar, a circuit adapted to be closed by said printing key to open said counting circuit, means adapted to be actuated by said line-space lever for closing said words-counting circuit, another printing key for said typewriter adapted to print a hyphen, a circuit adapted to be closed by said hyphen-key to cause the next operation of the first printing key to close the words-counting circuit, a relay including a connection in the hyphen-key circuit, a case-shift key, and means actuated by said case-shift key to excite said relay to make the hyphen circuit unclosable.

45. The combination with a typewriting machine including a space-bar, a printing key and a line-space lever, of a words-counting electric circuit adapted to be closed by said space bar, a circuit adapted to be closed by said printing key to open said counting circuit, means adapted to be actuated by said line-space lever for closing said words-counting circuit, another printing key for said typewriter adapted to print a hyphen, a circuit adapted to be closed by said hyphen-key to cause the next operation of the first printing key to close the words-counting circuit, means whereby operation of the line-space lever closes the circuit to make the previously closed hyphen circuit ineffective, a relay including a connection in the hyphen-key circuit, a case-shift key, and means actuated by said case-shift key to excite said relay to make the hyphen circuit inoperable.

46. The combination with a typewriting machine comprising a space-key and vowel-keys, of a words-counting circuit adapted to be closed by said space-key, a relay for holding it closed, a circuit closed by actuation of said vowel-keys, and a relay forming part of said circuit adapted to be actuated to open the words-counting circuit.

47. The combination with a typewriting machine comprising a space-key and numeral keys, of a words-counting circuit adapted to be closed by said space-key, a relay for holding it closed, a circuit closed by actuation of said numeral keys, and a relay forming part of said circuit adapted to be actuated to open the words-counting circuit.

48. The combination with a typewriting machine comprising numeral keys, vowel-keys and a space-key, of a words-counting circuit closed by operation of the space-key, means for opening said circuit by operation of a vowel-key or a numeral key, a hyphen-key, and means whereby the hyphen-key opens the words circuit if operated after a vowel, but is ineffective after a numeral.

49. The combination with a typewriting machine comprising numeral keys, vowel-keys and a space-key, of a words-counting circuit closed by operation of the space-key, means for opening said circuit by operation of a vowel-key or a numeral key, a hyphen-key, means whereby the hyphen-key opens the words circuit if operated after a vowel, but is ineffective after a numeral, a shift-key, and means whereby the shift-key makes the hyphen-key ineffective under either circumstance.

50. The combination with a space-key and vowel-keys forming part of a typewriting machine, of a circuit adapted to be closed by said space-key, a circuit adapted to be closed by said vowel-keys, a relay for each of said circuits, and interlocking armatures for said relays.

51. The combination with a typewriting machine comprising a space-key and vowel-keys, of a words circuit closed by the depression of the space-key, a relay in said circuit, a second circuit closed by depression of the vowel-keys, a second relay in said second circuit, a contact normally held open at said second relay, being held open by the armature of the first relay, an extension of the words circuit for actuating said first relay to permit the contact to be closed to maintain a current through the words circuit, a bridge in said second circuit normally open, but closed when the first relay is energized, and interlocking extensions of said relays to hold said contact normally open after the actuation of a vowel-key.

52. The combination with a typewriting machine comprising a space-key and vowel-keys, of a circuit closed by depression of the space-key, a relay in said circuit, a circuit closed by depression of a vowel-key, a relay in said last-named circuit, and a secondary relay operated by said last-named relay and interlocking with the first-named relay to control word counting.

53. The combination with a typewriting machine comprising a space-key, vowel-keys and number keys, of a words circuit closed by depression of the space-key, a vowel circuit closed by depression of a vowel-key, a number circuit closed by depression of a number key, a vowel-relay in the vowel circuit, a number-relay in the number circuit, a secondary relay operated by both the vowel-relay and the number-relay, and a words-circuit relay interlocking with said secondary relay.

54. The combination with a typewriting machine comprising a space-key, vowel-keys and number keys, of a words circuit closed by depression of the space-key, a vowel circuit closed by depression of a vowel-key, a number circuit closed by depression of a number key, a vowel-relay in the vowel circuit and controlling a secondary vowel circuit, a number-relay in the number circuit, a secondary relay operated by both the vowel-relay and the number-relay, a words-circuit relay interlocking with said secondary relay, a hyphen-key, a circuit closed by depression of the hyphen-key, a hyphen-relay for said hyphen circuit, and a terminal normally held open by said hyphen-relay adapted to control the secondary vowel circuit.

55. The combination with a typewriting machine comprising a space-key, vowel-keys, a shift-key and number keys, of a words circuit closed by depression of the space-key, a vowel circuit closed by depression of a vowel-key, a number circuit closed by depression of a number key, a vowel-relay in the vowel circuit and controlling a secondary vowel circuit, a number relay in the number circuit, a secondary relay operated by both the vowel-relay and the number-relay, a words-circuit relay interlocking with said secondary relay, a hyphen-key, a circuit closed by depression of the hyphen-key, a hyphen-relay for said hyphen circuit, a terminal normally held open by said hyphen-relay adapted to control the secondary vowel-circuit, a circuit closed by depression of the shift-key, and a shift-relay having a normally closed terminal for the hyphen-circuit and adapted to open said terminal when the shift-key is depressed.

56. The combination with a typewriting machine comprising a space-key, vowel-keys and number keys, of a words circuit closed by depression of the space-key, a vowel circuit closed by depression of a vowel-key, a number circuit closed by depression of a number key, a vowel-relay in the vowel circuit and controlling a secondary vowel circuit, a number-relay in the number circuit, a secondary relay operated by both the vowel-relay and the number-relay, a words-circuit relay interlocking with said secondary relay, a hyphen-key, a circuit closed by depression of the hyphen-key, a hyphen-relay for said hyphen circuit, a terminal normally held open by said hyphen-relay adapted to control the secondary vowel circuit, a line-space lever, a circuit closed by actuation of the line-space lever, a relay actuated by said last-named circuit, and a tertiary relay interlocking with the hyphen-relay and adapted to be energized by the line-space relay to release the hyphen-relay.

57. The combination with a typewriting machine having a hyphen-key and other character-keys, of a counter, connections set up by operation of the hyphen-key for operating said counter, and devices for modifying said hyphen-connections by operation of one of said other character-keys following the operation of the hyphen-key.

58. The combination with a typewriting machine having vowel-keys, a hyphen-key and a space-bar, of a words circuit closed by depression of the space-bar, a circuit closed by depression of a vowel-key, a vowel-relay in said circuit, a circuit closed by depression of the hyphen-key, a hyphen-relay in said circuit, a secondary relay closed by release of the hyphen-key and adapted to stay closed, and circuits adapted to release said secondary relay by the actuation of a vowel-key.

59. The combination with a typewriting machine having a hyphen-key, a line-space lever and other character-keys, of a counter, connections set up by operation of the hyphen-key for operating said counter, and devices for modifying said hyphen-connections by operation of said lever following the operation of the hyphen-key.

60. The combination with a typewriting machine having a hyphen-key, vowel-keys and other character-keys, of a counter, connections set up by operation of the hyphen-key for operating said counter, other connections operated by the vowel-keys, and devices for modifying said hyphen-connections by operation of one of said vowel-keys following the operation of the hyphen-key.

61. The combination with a typewriting machine having vowel-keys, a hyphen-key and a space-bar, of a words circuit closed by depression of the space-bar, a circuit closed by depression of a vowel-key, a vowel-relay in said last-named circuit, a circuit closed by depression of the hyphen-key, a hyphen-relay in said last-named circuit, a secondary relay closed by release of the hyphen-key and adapted to stay closed, circuits adapted to release said secondary relay by the actuation of a vowel-key, a line-space lever, a circuit closed by actuation of the line-space lever, and connections whereby actuation of the line-space lever releases the closed relays while holding the words circuit ineffective to register a word.

62. The combination with a typewriting machine having a hyphen-key and other character-keys, of a counter, connections set up by operation of the hyphen-key for operating said counter, and means for modifying said set-up connections by a second operation of the hyphen-key.

63. The combination with a typewriting machine having vowel-keys, a hyphen-key and a space-bar, of a words circuit closed by depression of the space-bar, a circuit closed by depression of a vowel-key, a vowel-relay in said last-named circuit, a circuit closed by depression of the hyphen-key, a hyphen relay in said last-named circuit, a secondary relay closed by release of the hyphen-key and adapted to stay closed, circuits adapted to release said secondary relay by the actuation of a vowel-key, and a circuit-closing device adapted to restore the relays to normal position, but ineffective to register a word in the words circuit.

64. The combination with a typewriting machine having a hyphen-key, a line-space lever and other character-keys, of a counter, connections set up by operation of the hyphen-key for operating said counter, means for modifying said connections by operation of the line-space lever, and means for otherwise modifying said connections by a second operation of the hyphen-key.

65. The combination with a typewriting machine comprising vowel-keys and a hyphen-key, of a hyphen-key relay, a vowel-key relay, a secondary relay operated by said vowel-key, a tertiary relay, a circuit normally held open by said tertiary relay, a circuit for actuating said tertiary relay by actuation of the secondary relay, and a normally open circuit for unlocking said secondary relay closed by the depression of a vowel-key.

66. The combination with a hyphen-key, of a circuit adapted to be closed by said hyphen-key, a numeral key, and a relay adapted to be operated by said numeral key to open said circuit.

67. The combination with a hyphen-key, of a circuit adapted to be closed by said hyphen-key, a numeral key, a relay adapted to be operated by said numeral key to open said circuit, a circuit for holding said numeral relay energized when once energized, a space-key, and a circuit closed by depression of the space-key to open the circuit energizing said numeral relay.

68. The combination with a hyphen-key, of a circuit adapted to be closed by said hyphen-key, a numeral key, a relay adapted to be operated by said numeral key to open said circuit, a circuit for holding said numeral relay energized when once energized, a space-key, a circuit closed by depression of the space-key and adapted to register a word, and a relay excited by the closing of said last-named circuit to de-energize the numeral key relay.

69. The combination with a numeral key, of a circuit adapted to be closed thereby, a shift-key, a relay energized by depression of the shift-key, and means for breaking said circuit by energizing said relay.

70. The combination with a typewriting machine having a space-key and a hyphen-key, of a circuit normally open, but adapted to be closed by depression of the space-key, and connections whereby said circuit may be closed by actuation of the hyphen-key.

71. The combination with a typewriting machine having a space-key and a line-space lever, of a counting circuit adapted to be closed by operation of either the lever or the key, and means for holding the circuit closed when once closed, to prevent successive action of either or both from causing the counting circuit to repeat a count.

72. The combination with a typewriting machine having a space-key and a line-space lever, of a counting circuit adapted to be closed by operation of either the lever or the key, means for holding the circuit closed when once closed, to prevent successive action of either or both from causing the counting circuit to repeat a count, a vowel-key also forming part of said typewriter, and means for opening said circuit by operation of the vowel-key.

73. The combination with a typewriting machine having a space-key and a line-space lever, of a counting circuit adapted to be closed by operation of either the lever or the key, means for holding the circuit closed when once closed, to prevent successive action of either or both from causing the counting circuit to repeat a count, a numeral key also forming part of said typewriting machine, and means for opening said circuit by operation of the numeral key.

74. The combination with a typewriting machine having a space-key and a line-space lever, of a counting circuit adapted to be closed by operation of either the lever or the key, means for holding the circuit closed when once closed, to prevent successive action of either or both from causing the counting circuit to repeat a count, a quotation-mark-key also forming part of said typewriting machine, and means for opening said circuit by operation of the quotation-mark-key.

75. The combination with a typewriting machine comprising printing keys, of means for making a single contact by the depression of one of said keys, a single relay operated by said contact, a plurality of secondary relays operated by the primary relay, and a separate contact for each secondary relay at the primary relay.

76. The combination with a typewriting machine having a number key, a hyphen-key and a vowel-key, of a number-relay for the number key, a hyphen-relay for the hyphen-key, a vowel-relay for the vowel-key, a circuit whereby the vowel-key may excite its relay, a secondary circuit normally opened at the vowel-relay and hyphen-relay, another secondary circuit closed at the number-relay, and means whereby actuating the number key opens the first secondary circuit at its relay, and actuation of the hyphen-key closes the other secondary circuit at its relay.

77. The combination with a typewriting machine having a hyphen-key, of a counting electric circuit, a primary relay for the hyphen-key, a secondary relay operated by the primary relay, and a tertiary relay controlled by the secondary relay to vary the control of the counting circuit by the hyphen-key.

78. The combination with a typewriting machine having a hyphen-key and vowel-keys, of a primary relay for the hyphen-key, a secondary relay having an armature normally locked, connections whereby said armature is adapted to be unlocked by the primary relay, a vowel-key relay, and means for relocking said armature by exciting the vowel-relay.

79. The combination with a typewriting machine having a number key, a vowel-key, a hyphen-key, and a case-shift device, of a relay for the number key, a relay for the vowel-key, a counter-relay energized by both said relays, a control-relay for the counter-relay, a hyphen-relay effective on the control-relay, and a case-shift relay controlling the hyphen-relay.

80. The combination with a typewriting machine having a number key, a vowel-key, a hyphen-key, and a case-shift device, of a relay for the number key, a relay for the vowel-key, a counter-relay energized by both said relays, a control-relay for the counter-relay, a hyphen-relay, a case-shift relay controlling the hyphen-relay, a line-space mechanism also forming part of said typewriter, a relay for said line-space mechanism, and connections whereby the hyphen-relay and the line-space relay control each other.

81. The combination with a typewriting machine having a hyphen-key and a relay excited by depression thereof, of a tertiary relay excited by release of said hyphen-key.

82. The combination with a typewriting machine having a hyphen-key, other character-printing keys and a case-shift mechanism, of a counting mechanism, connections for operating said counting mechanism by depression of any of the keys, and connections set up at the operation of the case-shift mechanism such that the operation of the hyphen-key in upper case is effective through one set of connections, the operation of another of said keys is effective through another set of connections in upper case, and the operation of still another of said keys is effective through a third set of connections in upper case.

83. The combination with a typewriting machine having a line-space lever and a vowel-key, of a relay for said vowel-key, and a words-counting circuit closed by the line-space lever, and adapted to be opened by said vowel-key relay.

84. The combination with a typewriting machine having a line-space lever and a vowel-key, of a relay for said vowel-key, a words-counting circuit closed by the line-space lever, and adapted to be opened by said vowel-key relay, a number key also forming part of the typewriter, and a relay therefor also adapted to open said circuit.

85. The combination with a typewriter and a words-counter, of a lamp, and a counter-circuit connected to said lamp to cause the lamp to display the state of the circuit.

86. The combination with a typewriter and a strokes-counter, of a lamp, and a counter-circuit connected to said lamp to cause the lamp to display the state of the circuit.

87. The combination with a typewriting machince having a space-key and a vowel-key, of a circuit for said space-key, a circuit for the vowel-key, a counter operated by one circuit, connections whereby the one circuit when closed remains closed, and connections whereby closing the other circuit opens the first named.

88. The combination with a typewriting machine having a space-key and a vowel-key, of a space-relay, a vowel-relay, a separate circuit for each relay, and means whereby when one circuit is closed the closing of the other circuit actuates its relay to open the first circuit.

89. The combination with a typewriting machine having a number key, a vowel-key and a line-space device, of a number-relay, a vowel-relay, a line-space relay, a counter-relay controlled by all of said relays, a control relay for the counter-relay, a hyphen-key, a case-shift device also forming part of said typewriting machine, a hyphen-relay, a case-shift relay controlling the hyphen-relay, circuits for said relays, and a device adapted to close certain circuits to restore the relays to normal condition.

90. The combination with a typwriting machine having a space-key and a vowel-key, of a circuit for said space-key, a circuit for the vowel-key, a counter operated by one circuit, connections whereby one circuit when closed remains closed, connections whereby closing the other circuit opens the first-named circuit, and a device adapted to close certain circuits for restoring the connections to normal condition.

91. The combination with a typewriting machine having a hyphen-key and vowel-keys, of a primary relay for the hyphen-key, a secondary relay having an armature normally locked, connections whereby said armature is adapted to be unlocked by the primary relay, a vowel-key relay, means for relocking said armature by exciting the vowel-relay, circuits for said relays, and a device adapted to close certain of said circuits to restore the relays to normal condition.

92. The combination with a typewriting machine having a number key, a vowel-key, a hyphen-key, and a case-shift device, of a relay for the number key, a relay for the vowel-key, a counter-relay energized by both said relays, a control relay for the counter-relay, a hyphen-relay, a case-shift relay controlling the hyphen-relay, a line-space mechanism also forming part of said typwriter, a relay for said line-space mechanism, connections whereby the hyphen-relay and the line-space relay control each other, circuits for said relays, and a device adapted to close certain of said circuits to restore the relays to normal condition.

93. The combination with a typewriting machine having a number key, a hyphen-key, and a vowel-key, of a number relay, a hyphen circuit normally closed at said relay, a vowel-relay, a hyphen-relay connected to the hyphen circuit and operated from the vowel-relay, and a circuit for the number key for opening the hyphen circuit at the number relay.

94. In a typewriting machine having a hyphen-key and a case-shift device, a circuit for said hyphen-key, and a case-shift relay through which said circuit passes to enable the relay to break it.

95. In a typewriting machine having a hyphen-key and a case-shift device, a circuit for said hyphen-key, a case-shift relay through which said circuit passes to enable the relay to break it, a primary hyphen-relay, and a secondary hyphen-relay connected to control a second exciting of said circuit.

96. The combination with a typewriting machine having a vowel-key and a hyphen-key, of a vowel-relay, a circuit therefrom, a secondary hyphen-relay adapted to make and break said circuit, and a primary hyphen-relay controlled by said circuit when closed.

97. The combination with a typewriting machine having keys and a universal bar actuable thereby, of a words-counter, a strokes-counter, a single mechanism for operating the counters, means whereby said mechanism may be rendered effective by said keys to actuate said words-counter, and means whereby said mechanism may be rendered effective by said universal bar to actuate said strokes-counter.

98. The combination with a typewriting machine having keys and a universal bar actuable thereby, of a words-counter, a strokes-counter, a single mechanism for operating the counters, an electric battery, and electrical connections therefrom controlled by said keys and said universal bar to determine the effectiveness of said mechanism on the counters.

99. The combination with a typewriting machine having keys and a universal bar actuable thereby, of a strokes-counter, a words-counter, a rotating shaft, means actuable by said shaft for actuating said strokes-counter, means actuable by said shaft for actuating said words-counter, universal-bar-controlled means for rendering said shaft effective on the first-mentioned means, and key-controlled means for rendering said shaft effective on the second-mentioned means.

100. The combination with a typewriting machine including a space-bar, of a word-counter, a circuit adapted to be closed by said space-bar and including a device for actuating said counter, and a second circuit adapted to be closed by closing the first circuit, and, when so closed, to hold said device in actuated condition after said space-bar has been released.

101. The combination with a typewriting machine including keys and a space-bar, of a lamp electrically connected thereto to flash separately at each stroke.

102. The combination with a typewriting machine including keys and a space-bar, of a lamp electrically connected thereto to flash separately at each word written by said keys.

103. The combination with a typewriting machine including keys and a space-bar, of a universal bar operated by the keys and the space-bar, a lamp electrically connected thereto to flash separately at each stroke, and a separate lamp adapted to flash separately at the writing of each word, and operated by alternate action of the space-bar and certain keys.

104. The combination with a typewriting machine including keys and a space-bar, of a lamp electrically connected thereto to flash separately at each stroke, and a counter operated concomitantly with the lamp.

105. The combination with a typewriting machine including keys and a space-bar, of a lamp electrically connected thereto to flash separately at each word, and a counter adapted to operate concomitantly with the lamp.

106. The combination with a typewriting machine including keys and a space-bar, of a universal bar operated by the keys and the space-bar, a lamp electrically connected thereto to flash separately at each stroke, a separate lamp adapted to flash separately at the writing of each word, and operated by alternate action of the space-bar and certain keys, and counters for counting the words and strokes separately and connected to operate concomitantly with the respective lamps.

107. The combination with a typewriting machine including keys and a space-bar, of a lamp electrically connected thereto to flash separately at each stroke, and a device adapted to cut out a certain proportion of strokes to enable flashes to be distinguished.

108. The combination with a typewriting machine including keys and a space-bar, of a lamp electrically connected thereto to flash separately at each stroke, a counter operated concomitantly with the lamp, and a device adapted to cut out a certain proportion of strokes to enable flashes to be distinguished.

109. The combination with a typewriting machine having a universal bar, of an electric contact, a counter operated by said contact, a device comprising a link adapted to fit over the universal bar and to be removed therefrom to operate said contact to operate the counter, and a device interposed between the contact and the counter for causing uniform current pulsations to operate the counter independently of the length of the various pulsations of said contact.

110. The combination with a typewriting machine comprising key levers, of keys on said levers arranged in banks, springs adapted to form electric contacts with said levers, a space-bar, a mounting therefor, a shorter spring for said space-bar adapted to contact with the space-bar mounting at substantially the limit of throw of the space-bar and a counter controlled by electrical impulses through said contacts.

111. The combination with a typewriting machine having key levers and a frame, of a batery connected to the frame, thin steel leaf springs adapted to form contacts with said key levers, circuits extending from said springs to the battery and closed by the key levers and a counter controlled by said circuits.

112. The combination with a typewriting machine having key levers and a frame, of a battery connected to the frame, thin steel leaf springs adapted to form contacts with said key levers, circuits extending from said springs to the battery and closed by the key levers, and counter-operating mechanism operated by said circuits.

113. The combination with a typewriting machine having key levers and a frame, of a battery connected to the frame, thin steel leaf springs adapted to form contacts with said key levers, circuits extending from said springs to the battery and closed by the key levers, and lamp-lighting mechanism operated by said circuits.

114. The combination with a typewriting machine having key levers and a frame, of a battery connected to the frame, thin steel leaf springs adapted to form contacts with said key levers, circuits extending from said springs to the battery and closed by the key levers, a relay operated thereby, and a counter-operating mechanism operated by said relay.

115. The combination with a typewriting machine having keys, of a counter having a reciprocating link, a rotating shaft, and an electric connection for causing said keys to selectively connect said link to said shaft to operate the counter.

116. The combination with a typewriting machine having keys, of a counter having a reciprocating link, a rotating shaft, a core fast to said shaft, an armature connected to said link, and electric connections for causing the keys to draw the armature to the shaft core to operate the link.

117. The combination with a typewriting machine having keys and a space-bar, of a word counting circuit adapted to be closed by said space-bar, a vowel-key circuit which is normally open, a relay forming part of said space-bar circuit and comprising an armature, and connections whereby said armature is effective to normally hold said vowel-key circuit open but permitted to be closed after the operation of the space-bar, and for re-opening it after a single operation of the space-bar.

118. The combination with a typewriting machine comprising a printing key and a case-shift mechanism, of a circuit closed by said key irrespective of the case in which printing is effected, another key, a second circuit closed by said other key, a connection whereby said other key closes the first circuit in upper case, and a counter controlled by said circuits.

119. The combination with a typewriting machine comprising a printing key and a case-shift mechanism, of a circuit closed by said key irrespective of the case in which printing is effected, another key, a second circuit closed by said other key, a connection whereby said other key closes the first circuit in upper case, a third key, a third circuit closed by said third key in lower case, connections whereby said third key is ineffective to close any circuit in upper case, and a counter controlled by said circuits.

120. The combination with a typewriting machine comprising a number key and a case-shift mechanism, of a circuit closed by said key irrespective of the case in which printing is effected, a hyphen-key, another circuit closed by said hyphen-key, and a connection whereby said hyphen-key closes the first circuit in upper case.

121. The combination with a typewriting machine comprising a number key and a case-shift mechanism, of a circuit closed by said key irrespective of the case in which printing is effected, a hyphen-key, a second circuit closed by said hyphen-key, a connection whereby said hyphen-key closes the first circuit in upper case, a "6" key, a third circuit closed by said "6" key in lower case, and connections whereby said "6" key is ineffective to close any circuit in upper case.

122. The combination with a typewriting machine comprising a printing key and a case-shift mechanism, of a circuit closed by said key irrespective of the case in which printing is effected, another key, a second circuit closed by said other key, a connection whereby said other key closes the first circuit in upper case, and a register adapted to be controlled by all said circuits.

123. The combination with a typewriting machine comprising a printing key and a case-shift mechanism, of a circuit closed by said key irrespective of the case in which printing is effected, another key, a second circuit closed by said other key, a connection whereby said other key closes the first circuit in upper case, a third key, a third circuit closed by said third key in lower case, connections whereby said third key is ineffective to close its circuit in upper case, and a register adapted to be controlled by all said circuits.

124. The combination with a typewriting machine comprising a number key and a case-shift mechanism, of a circuit closed by said key irrespective of the case in which printing is effected, a hyphen-key, a second circuit closed by said hyphen-key, a connection whereby said hyphen-key closes the first circuit in upper case, and a register adapted to be controlled by said circuits.

125. The combination with a typewriting machine comprising a number key and a case-shift mechanism, of a circuit closed by said key irrespective of the case in which printing is effected, a hyphen-key, a second circuit closed by said hyphen-key, a connection whereby said hyphen-key closes the first circuit in upper case, a "6" key, a third circuit closed by said "6" key in lower case, connections whereby said "6" key is ineffective to close its circuit in upper case, and a register adapted to be controlled by said circuits.

126. The combination with a typewriting machine comprising a printing key and a case-shift mechanism, of a circuit closed by said key irrespective of the case in which printing is effected, another key, a second circuit closed by said other key, a connection whereby said other key closes the first circuit in upper case, and a display-lamp adapted to be lit by the closing of said circuits.

127. The combination with a typewriting machine comprising a printing key and a case-shift mechanism, of a circuit closed by said key irrespective of the case in which printing is effected, another key, a second circuit closed by said other key, a connection whereby said other key closes the first circuit in upper case, a third key, a third circuit closed by said third key in lower case, connections whereby said third key is ineffective to close its circuit in upper case, and a display lamp adapted to be lit by the closing of said circuits.

128. The combination with a typewriting machine comprising a number key and a case-shift mechanism, of a circuit closed by said key irrespective of the case in which printing is effected, a hyphen-key, a second circuit closed by said hyphen-key, a connection whereby said hyphen-key closes the first circuit in upper case, and a display lamp adapted to be lit by the closing of said circuits.

129. The combination with a typewriting machine comprising a number key and a case-shift mechanism, of a circuit closed by said key irrespective of the case in which printing is effected, a hyphen-key, a second circuit closed by said hyphen-key, a connection whereby said hyphen-key closes the first circuit in upper case, a "6" key, a third circuit closed by said "6" key in lower case, connections whereby said "6" key is ineffective to close its circuit in upper case, and a display lamp adapted to be lit by the closing of said circuits.

130. The combination with a typewriting machine including a space-bar and character-keys including vowel-keys, of a counter, a counter-actuating device, a circuit including said device and adapted to be closed by said space-bar, a holding circuit also including said device and adapted to be closed by the first-mentioned circuit, a vowel-circuit having a contact device therein adapted to be closed by the first circuit, and a second contact device adapted to be
5 closed by any one of said vowel-keys, and a device in said vowel-circuit effective when the closing of the vowel-circuit is completed to break said holding circuit and thereby cause a return to normal condition.

ALFRED E. OSWALD.

Witnesses:
EDWARD THOMAS,
JENNIE P. THORNE.